US007778898B2

(12) United States Patent
Rider et al.

(10) Patent No.: US 7,778,898 B2
(45) Date of Patent: Aug. 17, 2010

(54) KNOWLEDGE PORTAL FOR EVALUATING PRODUCT ATTRACTIVENESS AND RISK

(75) Inventors: Eugene Rider, Oak Brook, IL (US); Scott Milkovich, Glen Ellyn, IL (US); Tina Brown, Wheaton, IL (US); Xiao Chen, Naperville, IL (US); Erh-An Huang, Westmont, IL (US)

(73) Assignee: RAM Consulting, Oak Brook, IL (US)

( * ) Notice: Subject to any disclaimer, the term of this patent is extended or adjusted under 35 U.S.C. 154(b) by 1754 days.

(21) Appl. No.: 10/757,578

(22) Filed: Jan. 15, 2004

(65) Prior Publication Data

US 2005/0159966 A1    Jul. 21, 2005

(51) Int. Cl.
*G06Q 40/00* (2006.01)
(52) U.S. Cl. ........................................ 705/35
(58) Field of Classification Search ................. 705/35
See application file for complete search history.

(56) References Cited

U.S. PATENT DOCUMENTS

| 5,761,093 | A | * | 6/1998 | Urbish et al. ............... 700/107 |
| 5,906,232 | A |   | 5/1999 | Bauer et al. |
| 5,999,908 | A | * | 12/1999 | Abelow ...................... 705/1 |
| 6,065,337 | A |   | 5/2000 | Milkovich et al. |
| 6,192,329 | B1 |   | 2/2001 | Rider et al. |
| 6,230,574 | B1 |   | 5/2001 | Rider et al. |
| 6,312,155 | B1 |   | 11/2001 | Stool et al. |
| 6,449,766 | B1 | * | 9/2002 | Fleming ...................... 725/28 |
| 6,529,892 | B1 | * | 3/2003 | Lambert ...................... 706/55 |
| 6,746,370 | B1 | * | 6/2004 | Fleming et al. ................ 482/1 |
| 6,826,541 | B1 | * | 11/2004 | Johnston et al. ........... 705/36 R |
| 7,567,917 | B2 | * | 7/2009 | Miller et al. .................. 705/10 |
| 2002/0143607 | A1 | * | 10/2002 | Connelly ..................... 705/10 |
| 2002/0161664 | A1 | * | 10/2002 | Shaya et al. .................. 705/26 |
| 2003/0033093 | A1 | * | 2/2003 | Nelson ........................ 702/34 |
| 2004/0015375 | A1 | * | 1/2004 | Cogliandro ................... 705/7 |
| 2004/0049478 | A1 | * | 3/2004 | Jasper et al. .................. 707/1 |

(Continued)

OTHER PUBLICATIONS

J.D. Power and Associates reports: Toyota models rank highest in five out of seven vehicle segments, Jul. 2, 2003, pp. 1-5.*

(Continued)

*Primary Examiner*—Hani Kazimi
*Assistant Examiner*—Bijendra K Shrestha
(74) *Attorney, Agent, or Firm*—McGuireWoods LLP

(57) ABSTRACT

A method and system is provided to uniformly evaluate product characteristics and identifying risk factors associated with the products so that a comprehensive scoring system provides an attractiveness score by age brackets and also provides for a consistent quantification process so that an overall characterization may be viewed by a color coded scoring scheme. The scoring system is based on predetermined scores created for age brackets and pre-identified product attributes. Through user feedback a new product may be evaluated using a series of questions that are associated with the predetermined scores producing an overall attractiveness score. Through another set of questions and predetermined mitigation scores, a mitigations score may be developed for the product so that by combining the attractiveness score with the mitigation score and comprehensive product score may be produced indicative of risk. The invention also provides for exploring various categories of characteristics that may lead to particular behavioral responses to the product by age group.

23 Claims, 23 Drawing Sheets

U.S. PATENT DOCUMENTS

2004/0199417 A1* 10/2004 Baxter et al. .................. 705/10
2005/0022234 A1* 1/2005 Strothman et al. ............ 725/34
2005/0086530 A1* 4/2005 Goddard ..................... 713/201

OTHER PUBLICATIONS

Greenpeace USA: 2003 Toy report Card, May 29, 2003, pp. 1-2.*

Routio, Pentti: Developing an Industrial Product Evaluation in Product Development, Mar. 22, 2003, pp. 1-11.*

Lorraine McCune, "Report on Children's Sensory Preferences", Rutgers University, Jun. 14, 2003.

* cited by examiner

20. Can the product be used by a child to help her/him become someone or something else (e.g. a teacher, a doctor, a superhero)?

21. Does the product allow the user to manually move any parts or components?

22. Does the product have any lights?

23. Does the product taste or smell sweet, fruity, or floral?

24. Does the product allow the user to have a feeling of independence?

25. Is the product associated with any role models (e.g. real or fictional) consumers may have? YES 26. Does the product emit any noises? YES 27. Are the sides of the product significantly different?

28. Does the product resemble any other products, objects, or characters that a child may be familiar with?

29. Is the product intended to be used for any aggressive type play or could play with the product potentially turn aggressive (e.g. crashing cars, fighting superheros)?

30. Does the product change any of it's characteristics if thrown (e.g. changes shape, makes noises, etc.)?

31. Does the product change any of it's characteristics if banged (e.g. changes shape, makes noises, etc.)?

32. Does the product change any of it's characteristics if dropped (e.g. changes shape, makes noises, etc.)?

KNOWLEDGE PORTAL FOR EVALUATING PRODUCT ATTRACTIVENESS AND RISK

BACKGROUND OF THE INVENTION

1. Field of the Invention

The invention generally relates to a system and method of evaluating product attractiveness, and more particularly, to evaluating product attractiveness and risk by age brackets and product characteristics.

2. Background Description

Risk assessment is an important aspect in introducing new products to market. A manufacturer, distributor and/or retailer needs to understand the potential risks that introducing a product may entail. Risk assessment may also be used to ensure the quality of the products introduced and to avoid and/or minimize adverse customer and public relations.

Risk assessment may be used to avoid and/or minimize legal liability when introducing a product. For example, if a product is found to increase the risk of fire (e.g., an electric toaster with poor wiring), a manufacturer may elect not to introduce the item, or perhaps, choose to redesign it to reduce the particular risk. Alternatively, risk assessment performed on a device by a manufacturer may demonstrate the manufacture's care in designing the device if any problems later develop. For example, the risk assessment may be entered as evidence in a court proceeding where the manufacturer's duty of care is at issue.

In the case of toys, as another example, risk assessment is important when introducing new toys to market. However, there is currently little in the way of standardized quantification of factors surrounding risk in toys and no objective risk assessment that occurs in a systematic fashion. Current systems to evaluate risk tend to be performed on a toy-by-toy basis with no criteria for assessing toys overall. When toys are evaluated, the risk assessment typically utilizes a piecemeal approach, for example, choking only, or burning only, etc. There is no systematic approach to categorizing an overall approach for unifying and comparing all, or even a substantially large number of factors.

Products are currently tracked by the United States Consumer Product Safety Commission using the National Electronic Injury Surveillance System (NEISS). NEISS provides a product coding system (typically a four-digit code) for a wide variety of products ranging from drugs, appliances, to toys, etc. However, the NEISS system typically only tracks injuries and complaints associated with products, but does not provide a risk assessment system for general use for evaluating these products during design, manufacturing or as a tool for a potential purchaser of the product to gain risk information.

Even when current methods of assessing risk are employed, the results are often interpreted differently by different people, perhaps reaching conflicting opinions regarding risk levels and/or severity of the risk levels. As such, no global assessment mechanisms exist using standard evaluation techniques that provide an overall value for a product based on the underlying intrinsic risk factors of the product.

SUMMARY OF THE INVENTION

In an aspect of the invention, a method is provided for assessing one or more characteristics associated with a product, each of the characteristics having an associated predetermined score based on age, and generating a risk product score for the product based on each of the one or more assessed characteristics and associated predetermined scores.

In another aspect of the invention, a method is provided for assessing product risk comprising the steps of providing predetermined attractiveness scores associated with one or more product attributes and one or more age brackets, prompting for feedback relating to each the one or more product attributes, and computing at least one product attractiveness score for the one or more product attributes based on the predetermined attribute scores and the feedback.

In another aspect of the invention, a method for assessing product risk is provided comprising the steps of providing predetermined attractiveness scores associated with one or more product attributes and one or more age bracket and providing predetermined mitigation scores associated with the mitigation categories and the one or more age bracket. Further included are the steps of prompting for feedback relating to each of the one or more product attributes and one or more mitigation categories, generating a composite attractiveness score and a composite mitigation score based on the feedback and generating a composite product score based on a difference between the composite attractiveness score and the composite mitigation score.

In another aspect of the invention, a method is provided for assessing product risk comprising the steps of providing predetermined attractiveness scores associated with one or more product attributes and one or more age bracket, providing predetermined mitigation scores associated with one or more mitigation categories and the one or more age bracket, and prompting for feedback relating to each of the one or more product attributes and one or more mitigation categories. Further provided are the steps of generating a composite attractiveness score and a composite mitigation score based on the feedback and generating a composite product score based on a difference between the composite attractiveness score and the composite mitigation score.

In another aspect of the invention, a system for assessing product attractiveness and risk is provided. The system comprises a means for providing predetermined attractiveness scores associated with one or more product attributes and one or more age brackets, a means for prompting for feedback relating to each the one or more product attributes, and a means for computing a product attractiveness score for the one or more product attributes based on the predetermined attribute scores and the feedback.

In another aspect of the invention, a computer program product is provided comprising a computer usable medium having readable program code embodied in the medium and includes a first computer program code to

BRIEF DESCRIPTION OF THE DRAWINGS

FIGS. 2A-2B represent a graphical user interface (GUI) for receiving input on product attributes;

FIGS. 2C and 2D represent a predetermined scoring reference;

FIG. 2E represents a GUI of a blank attractiveness scoring summary grid;

FIG. 2F represents a GUI of an attractiveness scoring summary grid with composite results;

FIGS. 3A and 3B represents a GUI for receiving feedback on product factors that may mitigate risk;

FIG. 3C is an exemplary spreadsheet representation of predetermined mitigation scores;

FIG. 3D represents a GUI showing a blank mitigation summary grid;

FIGS. 5A-5D represent an embodiment of an exploration strategy GUI showing a series of exploration questions;

FIG. 5E is a representation of a GUI showing an embodiment of an overall exploration composite score matrix;

FIGS. 6A-6E represent spreadsheets showing exemplary predetermined composite scoring matrices corresponding to the questions 1-5 of FIG. 5A.

DETAILED DESCRIPTION OF EMBODIMENTS OF THE INVENTION

The invention is directed to a system and method of uniformly evaluating product characteristics and identifying risk factors with the product so that a comprehensive scoring system provides an attractiveness and mitigation score by age brackets. Attractiveness includes identifiable product characteristics such as sensory, physical, and cognitive. Mitigation includes identifiable factors that may mitigate hazard or lower likelihood that a caregiver or user might use the product without giving thought to the product's hazards. Attractiveness may refer to a consumer's interest level in a product. It is determined in part by the product's characteristics and the age of the consumer. On the other hand, mitigation may refer to potential characteristics or issues (e.g. caregiver perception of the product, user perception of the product, the price of the product, and/or effective labeling) that may reduce risk.

The invention also provides for a consistent quantification process so that a comprehensive characterization of risk for a product may be produced in view of age brackets of users and other characteristics by combining the attractiveness score and mitigation score. The invention, in embodiments, may be implemented using a database management system (DBMS) and browsers running on a computing platform such as a server and/or client system, such as a personal computer (PC). Exemplary embodiments of the invention, presented herein, employ an Oracle database from Oracle Corporation and a Microsoft Internet Explorer (IE) browser, however, any similar database management system or browser may be employed as one of ordinary skill in the art would recognize. In embodiments, the invention provides for an interactive session to be launched and performed from any convenient location by accessing a network, such as for example, the Internet, and gaining access to the invention (e.g., by appropriate Internet address).

Figure 1:
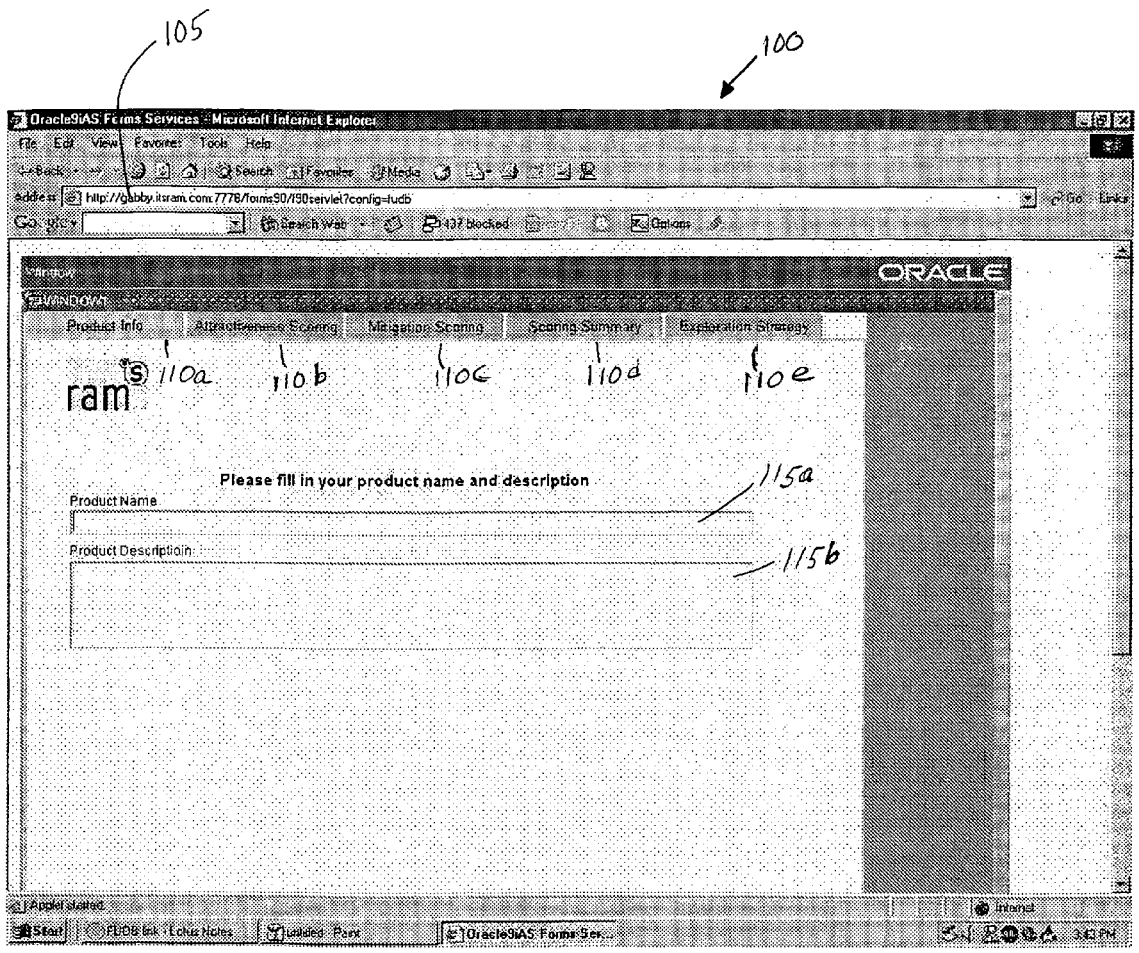
FIG. 1 represents an embodiment of a graphical user interface (GUI), according to the invention.

FIG. 1 represents an embodiment of a graphical user interface (GUI), generally denoted by reference numeral 100, for establishing and completing a product assessment session. The invention provides for being accessible in various manners including, for example, the Internet using a uniform resource relocator (URL) 105. The GUI 100, includes navigation tabs 110a-110e for quickly moving from one component of the invention to another, as discussed below. When using the invention, progression through the tabs 110a-110e typically occurs in sequence from 110a to 110e, but the invention is not limited to this sequence and navigation may occur in a different sequence as necessary. The GUI 100 of FIG. 1 shows that Product Info tab 110a has been selected for initiating a session, typically for characterizing a new product, or alternatively, for resuming a previous session. Fields 115a and 115b prompt a user for a product name and a description of the product, respectively. The NEISS product code may be employed as part of this input. During a first time session for a product, the invention may establish a new database entry associated with the entered product name.

Figure 2A:
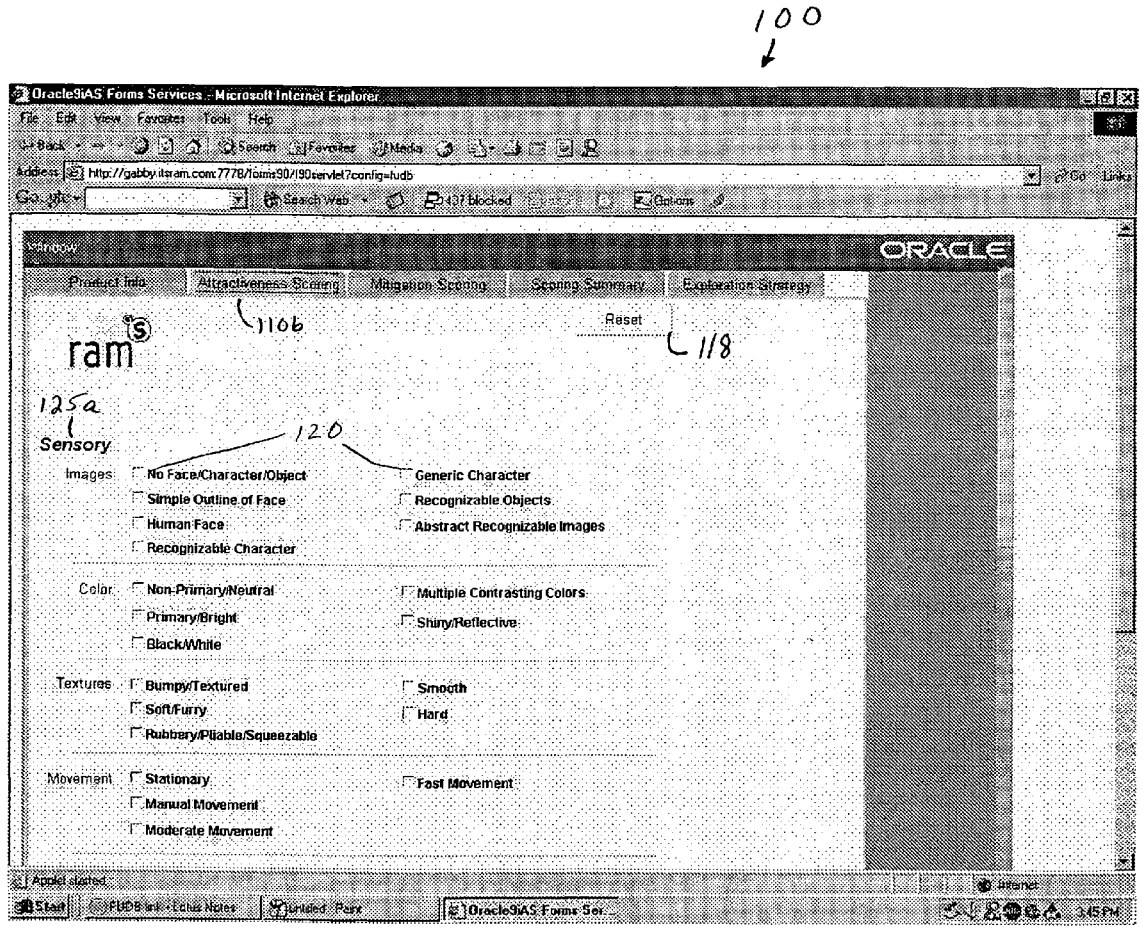
Figure 2B:
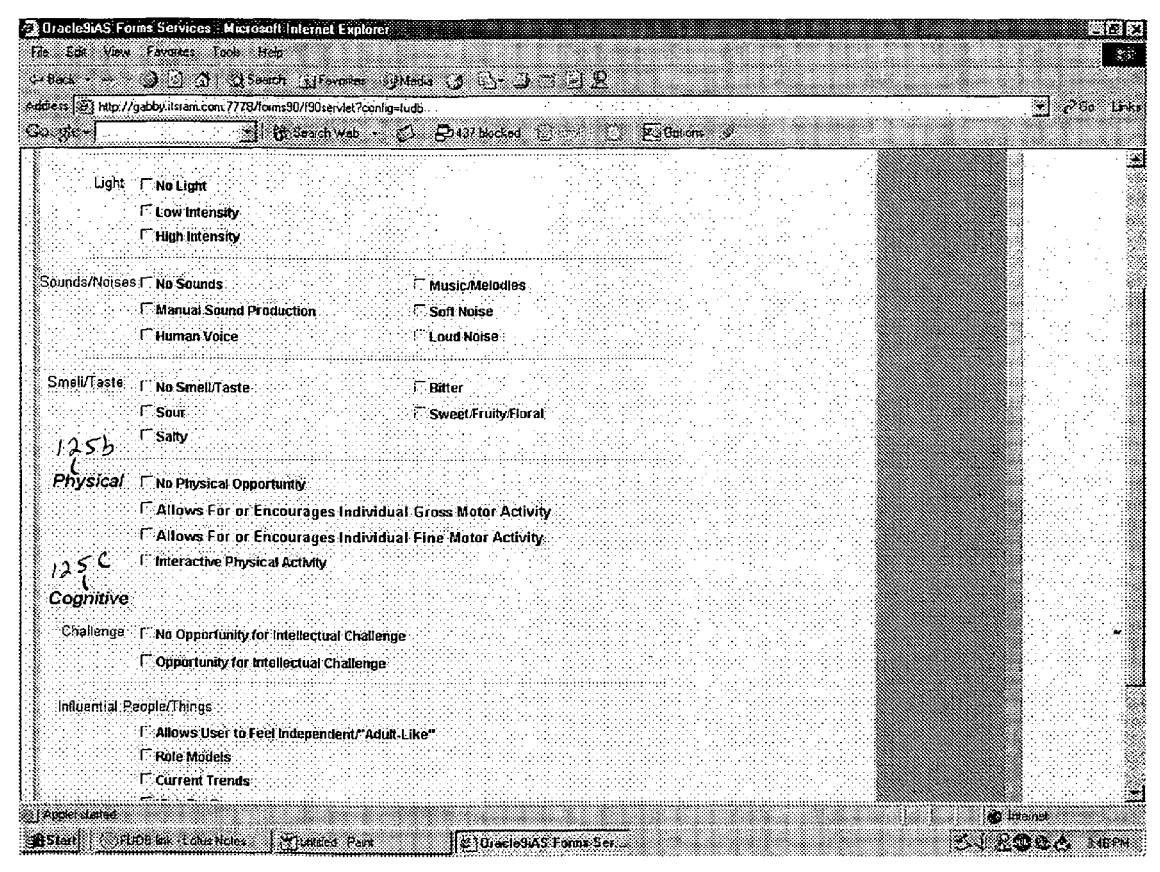

Attractiveness scoring navigation tab 110b, when selected by a user, provides for establishing an attractiveness score for a product as identified under the Product info navigation tab 110a. FIGS. 2A and 2B represents a GUI for receiving input on product attributes. Referring now to FIGS. 2A and 2B, attractiveness scoring provides an easy and consistent process for describing attractiveness attributes of the product. The product may be quickly described or characterized by a user simply by responding (e.g., by clicking with a mouse) to predetermined prompts, e.g. 120. A reset button 118 is provided for resetting selections. Attractiveness scoring may be partitioned into at least three categories for capturing the characteristics of the product. These categories include: (i) Sensory attributes 125a that prompt the user for feedback concerning attributes of the product involving, but not limited to: images, color, textures, movement, light, sounds/noises, and smell/taste, (ii) Physical attributes 125b that prompt a user for feedback concerning physical interaction, and (iii) Cognitive attributes 125c that prompt a user for feedback concerning attributes of the product involving, but not limited to: intellectual challenge, and influential attributes. When a user selects any of these attributes, an affirmation of that type of attribute is established and associated with the product when the user selects the submit button 134. A user may alter a choice (e.g., to correct input) by simply "unclicking" a response.

At any time, a user may move a cursor over the text of a prompt (e.g., No/face/character/object, Simple outline of face, Fast Movement, etc.) to view more detailed information/explanation on the prompt or group header that represents an attribute category (e.g., images, color, textures, etc.) in the three categories of sensory 125a, physical 125b, and cognitive 125c. The detail may be presented (e.g., in a text box) when the cursor is placed over the header (e.g., images, color, textures, movement, etc.) or prompt (e.g., 120) and the text in the text box may include, for example:

Images header—"Faces, characters, objects"
    Simple Outline of Face—"Simple facial outline: may be as simple as three dots which can be interpreted as two eyes and a nose or mouth"
    Human Face—"Human face on product"
    Recognizable Character—"Child friendly characters-licensed (e.g., Barney, Winnie the Pooh, Ronald MacDonald, Energizer Bunny) or cultural (e.g., Easter Bunny, Santa Claus)"
    Generic Character—"Child friendly generic cartoonish characters and/or personified objects"
    Recognizable Objects—"Objects that may be recognizable to children—not personified (e.g. animals, flowers, houses, vehicles (trains, plains), snowflakes, etc.)"
    Abstract recognizable images—"Patterns that are not entirely clear to a child (e.g., swirly outlined hearts or stars instead of plain red hearts and yellow stars)"
Color header—(may or may not have additional detail)
    Non-primary/neutral—"Non-primary colors (e.g., pastel, earth-tones)"
    Primary/Bright—"Bright and primary colors (e.g., yellow, red, green, blue, neons) these colors also often contrast when placed side by side which also makes a product more attractive than when a single color is used"
    Black/White—"May be solid black or solid white"
    Multiple contrasting colors—"Two or more colors adjacent to each other resulting in stark contrast"

Shiny/Reflective—"Object which are shiny or reflective (e.g., the metal on a spoon)"
Texture—(may or may not have additional detail)
   Bumpy/textured—"Product has grooves, indentations, or peaks the finger or tongue moves up or down when moved over it"
   Soft/Furry—"Soft or furry items (e.g., pillow, stuff animals, blankets)"
   Rubbery/Pliable/Sqeezable—"Items that are rubber, pliable, or squeezable (e.g., soft plastic toys, balloons, rubber bands)"
   Smooth—"No identifiable grooves or textures"
   Hard—"No identifiable grooves or textures"
Movement—(may or may not have additional detail)
   Stationary—(may or may not have additional detail)
   Manual Movement—"A part of the product can be articulated (bend, twist, etc.) by consumer, does not include if entire object can be picked up and moved"
   Moderate Movement—"Any component or lights within the product that move (or e.g., approx. 90 deg/sec.) or flash (flash rate is subjective)"
   Fast Movement "Any component or lights within the product that move (or e.g., >180 deg/sec.) or flash (flash rate is subjective)"
Lights—(may or may not have additional detail)
   No light—(may or may not have additional detail)
   Low intensity—"The level of low light is subjective"
   High Intensity—"The level of high light is subjective"
Sounds/Noises—(may or may not have additional detail)
   No sounds—(may or may not have additional detail)
   Manual sound production—"Manual sound production is part of the product function (e.g., rattle noises, spray noises, electronic noises). It is not included because a child may be able to bang a product"
   Human Voice—"Human voice (e.g., male, female, or child) and musical sounds (any variety of music-classical, nursery rhymes, pop music, etc.)"
   Music/Melodies—"Human voice (e.g., male, female, or child,) and musical sounds (any variety of music-classical, nursery rhymes, pop music, etc.)"
   Soft Noise—"The level of sound is subjective"
   Loud Noise—"The level of sound is subjective"
Smell/Taste—(may or may not have additional detail)
   No Smell/Taste—(may or may not have additional detail)
   Sour—"Sour tastes/smells (e.g., lemon, grapefruit)"
   Salty—"Salty tastes/smells (e.g., chips, peanuts, french fries)"
   Bitter—"Bitter tastes/smells (e.g., lemon peel)"
   Sweet/Fruity/Floral—"Sweet tastes/smells (e.g., candles, floral, fruity)"
   No physical activity—(may or may not have additional detail)
   Allows or Encourages Individual Gross Motor Activity—"Product encourages physical activity such as running, jumping, or climbing"
   Allows or Encourages Individual Fine Motor Activity—"Product encourages small motor skill activity and/or hand-eye coordination (e.g., arts and crafts products, model items)"
   Interactive Physical Activity—"Any type of play that is interactive between the product and consumer and/or two or more consumers with the product"
   No opportunity for intellectual challenge—(may or may not have additional detail)
   Opportunity for intellectual challenge—"Product or components have characteristics that may challenge individuals intellectually (e.g., product or components are smaller and require more fine motor skills to manipulate, the product has more complex rules the individual must think about)"
   Allows User to Feel Independent/"Adult-like"—"Product encourages a feeling of independence and/or allows the child user to feel more "adult" (e.g., self-feeding or preparation food products)"
   Role Models—"Music, sports, TV/Movie media figures are somewhat associated with the product"
   Current Trends—"Product is in whole or part a "trend" liked by consumers of a certain age. Young consumers will be attached to a product because their friend like it"
   High realism—"Product has high levels of realism and/or may appear like an adult product or smaller version of an adult possession. The product is no longer cartoonish or childish in nature."

Figure 2C:
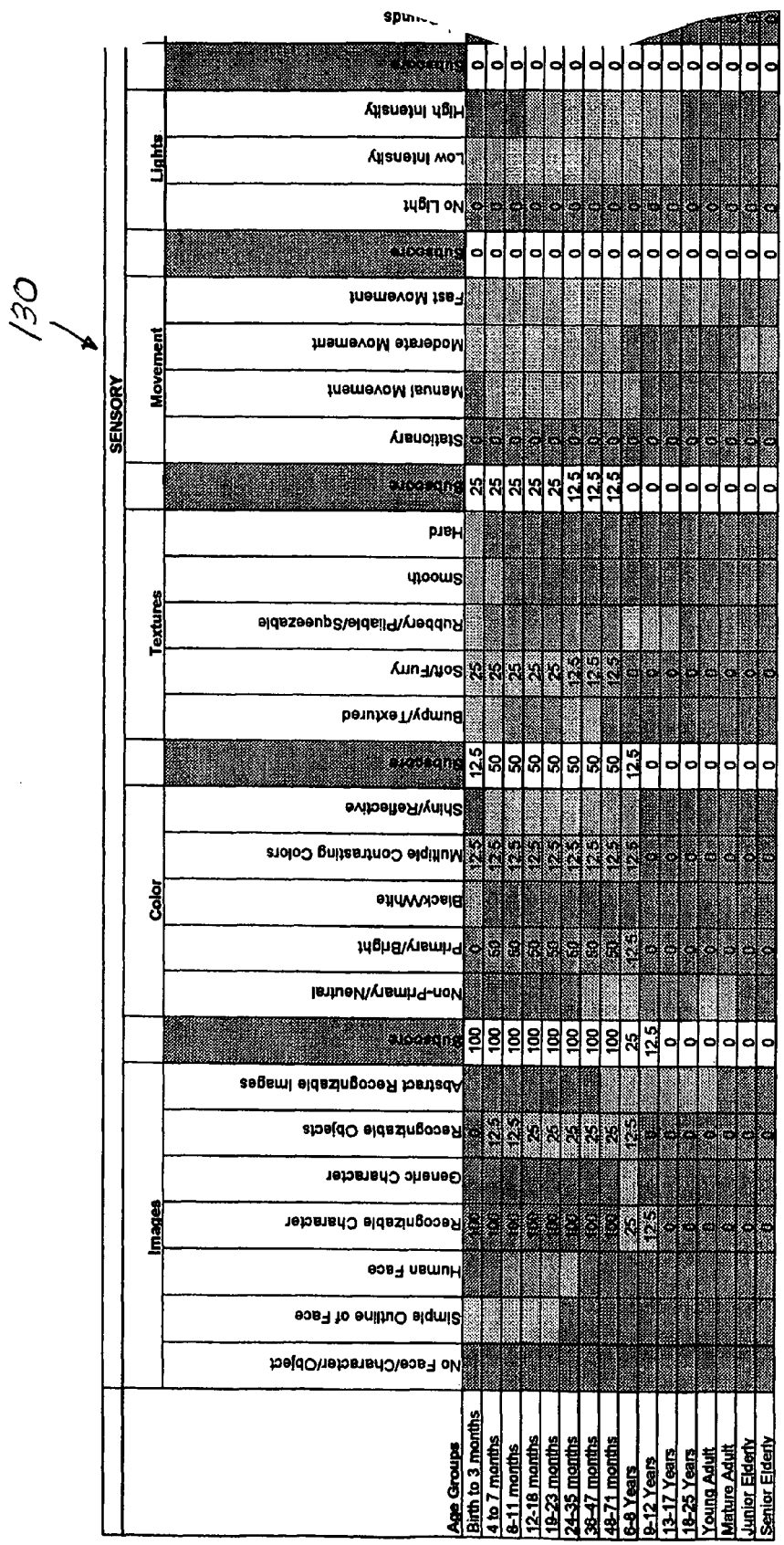
Figure 2D:
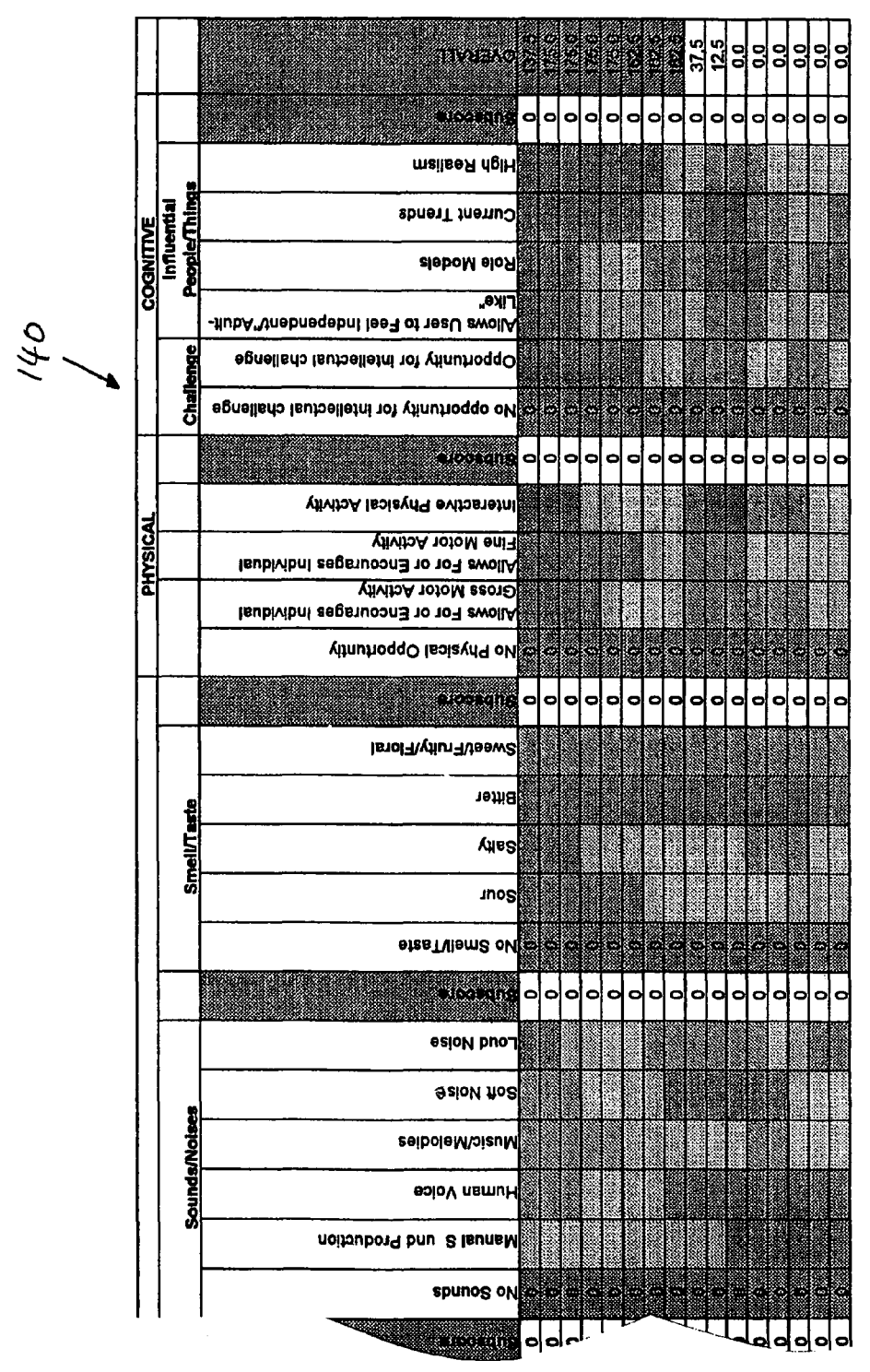

FIGS. 2C and 2D represent an illustrative example of a predetermined scoring reference for a particular product having certain attributes chosen from the lists of FIGS. 2A and 2B. The predetermined scoring reference, generally denoted by reference numeral 130 and 140, respectively, include predetermined scores corresponding to each attribute that may be selected in FIGS. 2A and 2B. For illustrative purposes, the predetermined scores are shown in spreadsheet fashion (but may also be a database); however the spreadsheet typically may not be viewable by a user of the invention. The predetermined scores are based on the level of attractiveness of each particular characteristic/attribute to each of sixteen different age groups ranging in age from birth to the elderly. The predetermined scores may be color coded with each color representing a level of attractiveness from none/low to high. The predetermined scoring reference 130, 140 is based on extensive correlation studies that have ascertained the relationship of the attractiveness attribute by age group based on behavior preferences and observed preferences. The attractiveness scoring ranges include: "0" (low or no attractiveness) to "100" (high interest) with other levels between (e.g., low/moderate, moderate, and moderate/high), however, other similar scales may be employed as one of ordinary skill in the art may recognize. By way of example, a toy, for example, may have a very high attractiveness score, "100" for an infant (birth to three months) but a very low attractiveness score, "0", for an adult based on the category of "images" and "recognizable character".

As a user selects applicable attributes via the GUI 100 of FIGS. 2A and 2B, predetermined scores are accessed from the data contained in the spreadsheet 130, 140 (or alternatively a database) of FIG. 2C and 2D and added together to provide a total overall attractiveness scoring for a category. For example, under the category for "image", shown in FIG. 2C, the subtotal for an infant may be "100" but only "25" for a child between the ages of 6 and 8 years.

Figure 2E:
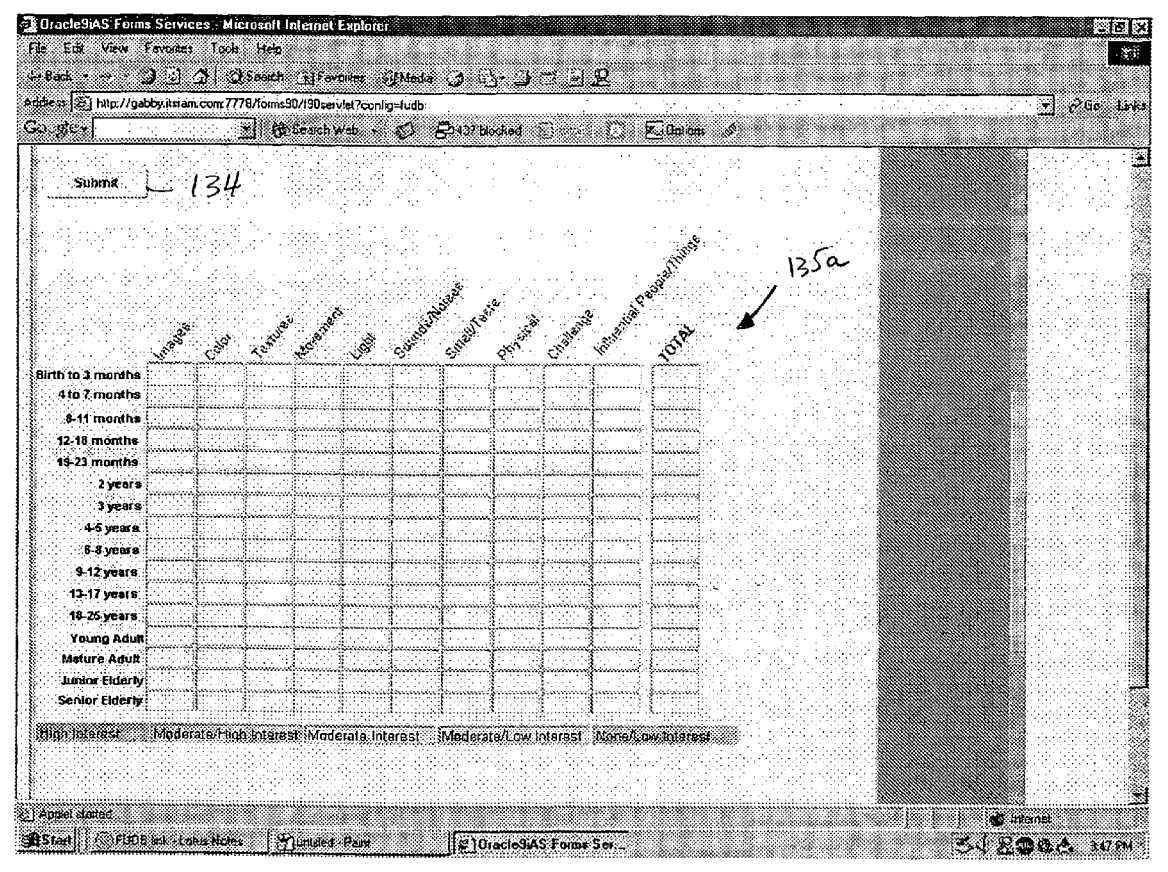

FIG. 2E represents a GUI of a blank attractiveness scoring summary grid 135a, prior to submission of responses to the prompts 120, i.e., summary grid 135a is blank until submit button 134 has been clicked by a user. Attractiveness scoring summary grid 135a illustrates the organization of resulting information that the invention generates. The vertical axis of the summary grid 135a provides breakdown of information by age groups, for example, birth to 3 months, 4 to 7 months . . . senior elderly. The horizontal axis provides a scoring by each attractiveness attribute for each age group (vertical axis). The invention provides a predetermined attractiveness scoring for the product in each of the summary grid locations 135a based on the feedback obtained from the user as entered via the GUI 100 of FIGS. 2A and 2B.

Figure 2F:
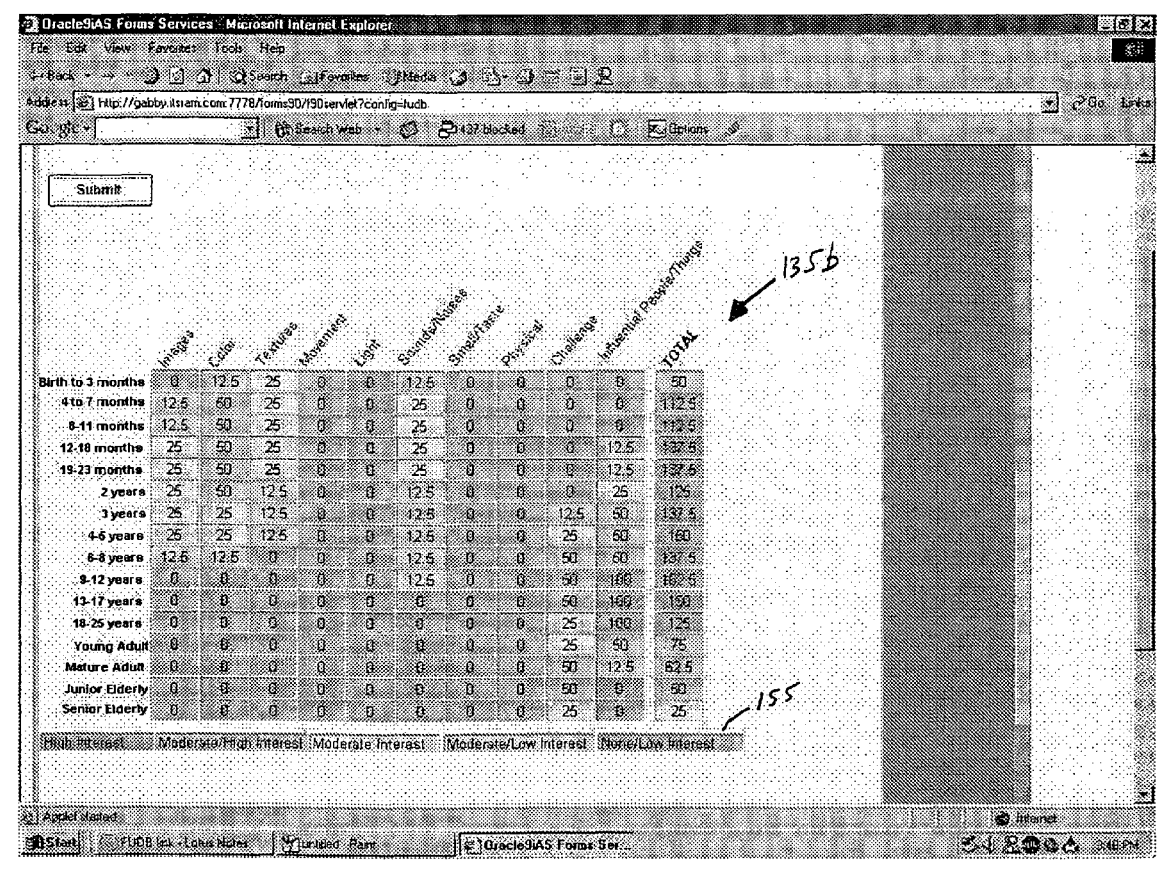

FIG. 2F represents a GUI of an attractiveness scoring summary grid 135b with composite results. These scores are obtained from the predetermined scoring reference 130, 140. Attractiveness scoring summary grid 135b represents an example of a summation report that may be produced by the invention once the user has selected the submit button 134. To aid visual interpretation, the score ranges may be color coded. For example, a score of "0" to "12.5" (no/low interest) may be displayed in blue and score of "12.5" to "25" (low/moderate interest) may be displayed in green. A score of "25" to "50" (moderate interest) may be displayed in yellow and a score of "50" to "100" (moderate/high) may be conveyed in orange, while a score of "100" or more may be displayed in red (high interest). In embodiments, the color range coding may be different as well as the color scheme.

The TOTAL column of FIG. 2F summarizes each horizontal line to produce a composite score for each age bracket. This column may also be color coded so that scores over 100, for example, appears in red. Therefore, according to the example of FIG. 2F, age brackets 4-7 months through 18-25 years may be presented in red, representing a high attractiveness score for those age brackets. The remaining age brackets, except senior elderly, may have a moderate/high score while the senior elderly has a moderate interest score. The color coding scale 155 is also provided for easy reference and interpretation.

Examination of an exemplary column, such as attribute "color", reveals that there may be a moderate/high interest factor for age brackets 4-7 months to 2 years (score of 50, color coded orange) for a particular product. Examination of "influential/people/things" column reveals that there may be a high interest score (i.e., 100, color coded red) for this cognitive category in age brackets 9-12 years through 18-25 years. The summary matrix 135b therefore provides a succinct visual presentation of attribute ratings by age bracket with a composite TOTAL score. These scores may be indicative of levels of risk or attractiveness for the assessed product.

Figure 3A:
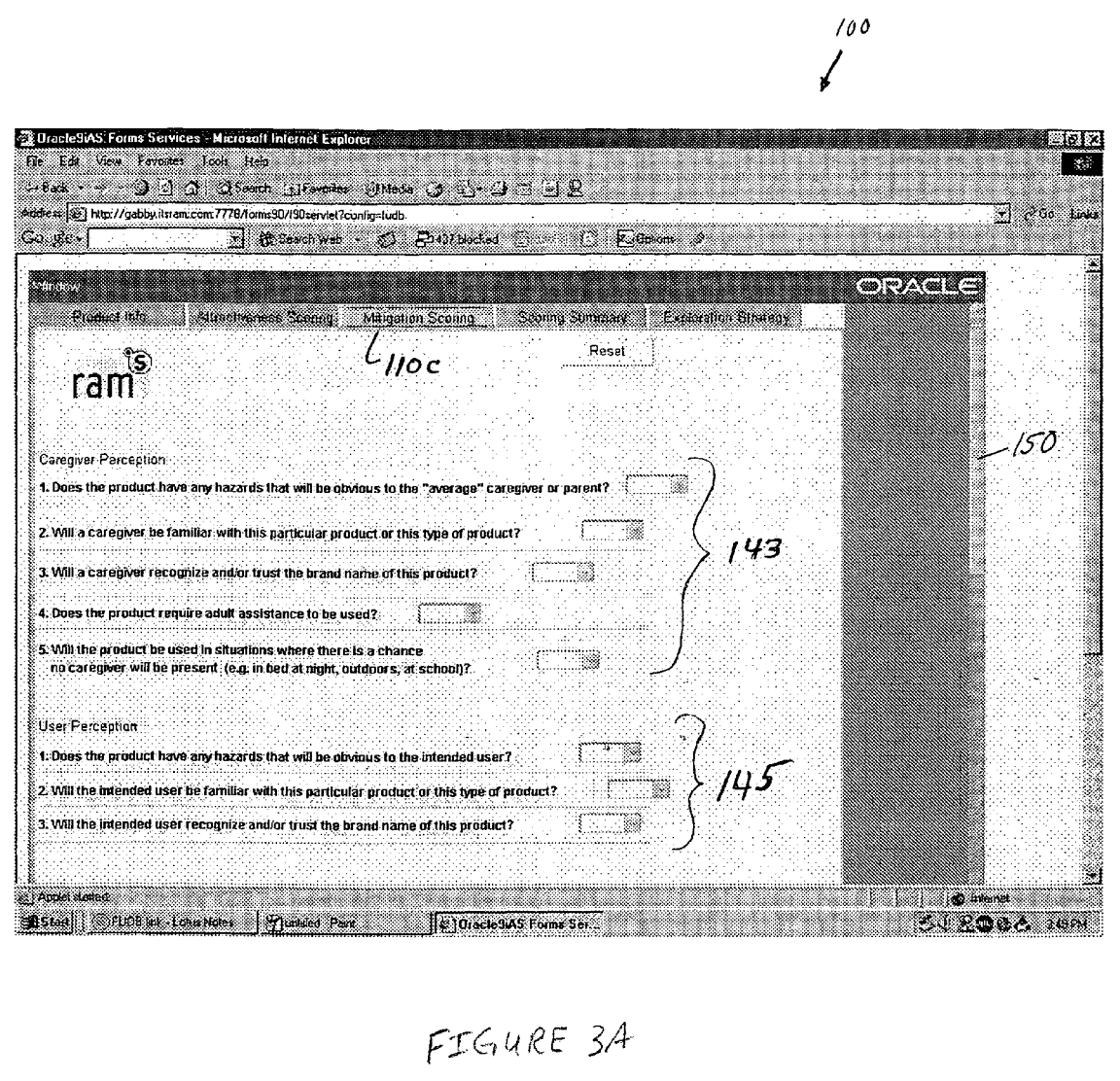
Figure 3B:
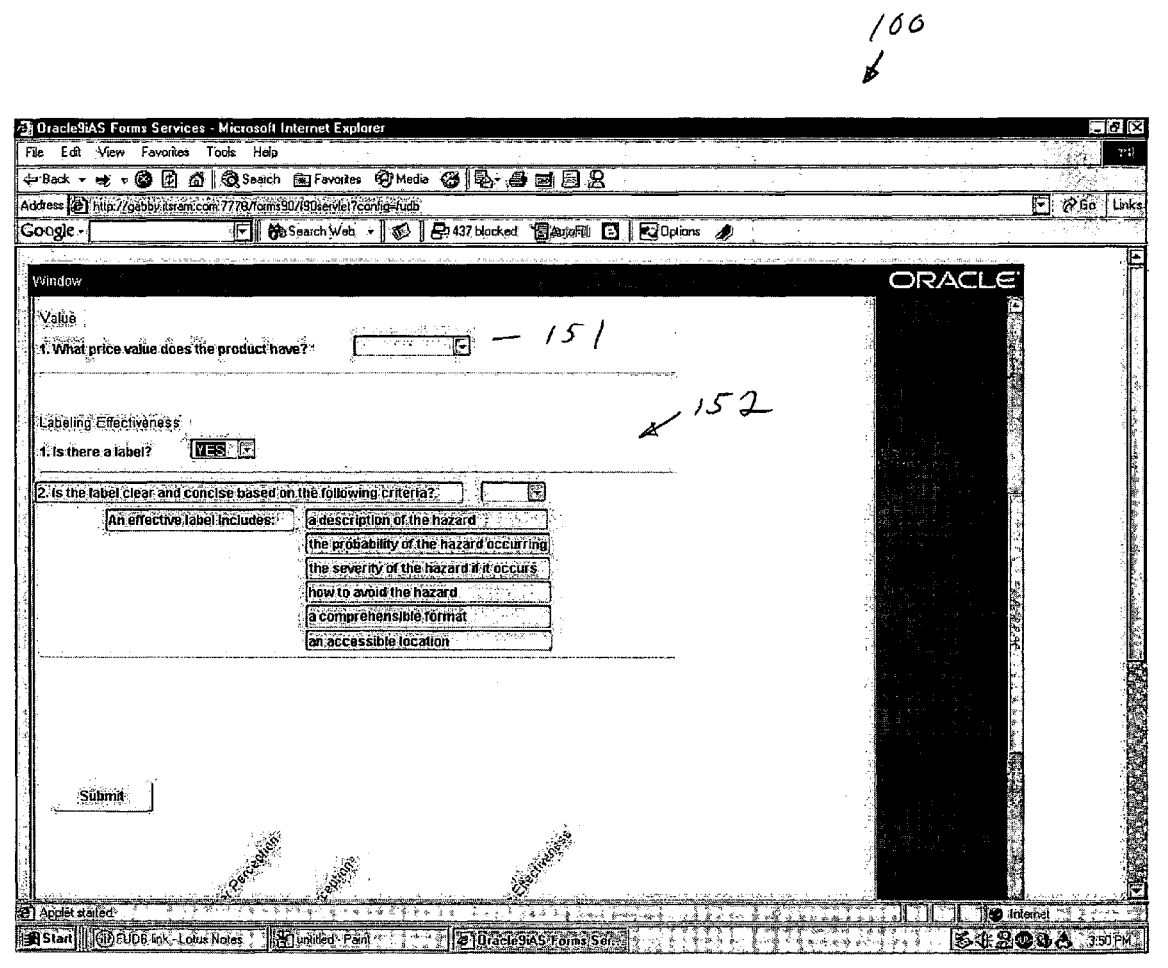

FIGS. 3A and 3B represent a GUI for receiving feedback on product factors that may mitigate risk and may be selected by clicking the Mitigation Scoring navigation tab 110c. The Mitigation Scoring includes queries into (i) caregiver perceptions about the product, (ii) user perceptions about the product, (iii) value perceptions about the product, and, (iv) labeling effectiveness about the product. Of course, other perceptions are also contemplated by the invention. Each question solicits either a yes or no response.

The caregiver perception questions 143 solicit feedback from the perspective of a caregiver (e.g., a parent or guardian, or the like). The caregiver perception questions 143 provide feedback as to the degree of risk that may be mitigated by a caregiver (e.g., how aware a typical caregiver would be about the subject of the question). Also, the user perception questions 145 solicit feedback concerning a perspective user of the product, and solicit feedback concerning the degree of risk that may be perceived to be mitigated by a user. Slide tab 150 permits access to remaining other questions regarding value 151 and labeling effectiveness 152. These questions may range from, for example, the familiarity of the product by the caregiver to whether the user trusts the brand or type of product, to name just a few possible questions.

Figure 3C:
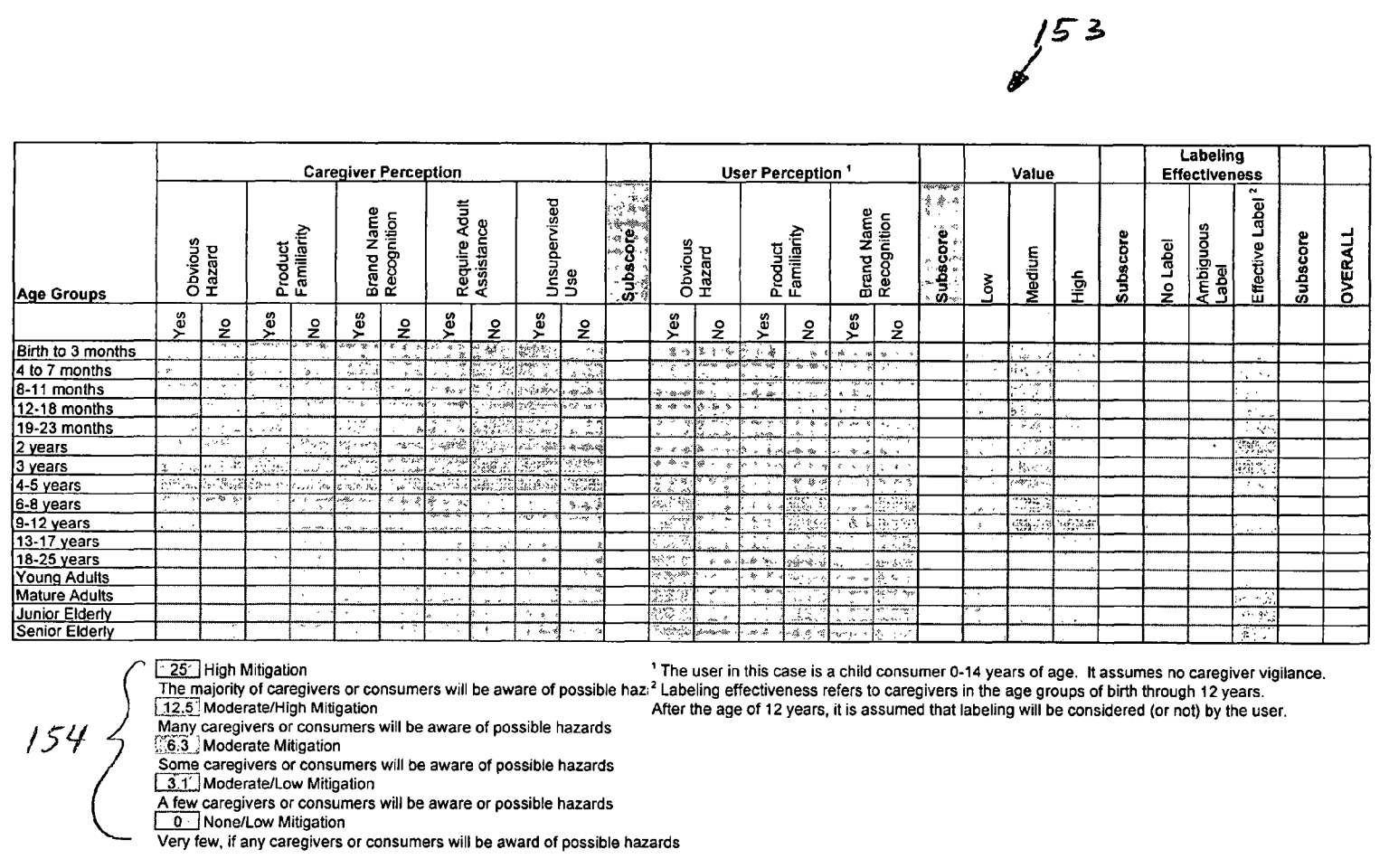

FIG. 3C is an exemplary spreadsheet representation of predetermined mitigation scores, generally denoted by reference numeral 153. These predetermined scores are used to score the mitigation responses of FIGS. 3A and 3B. The spreadsheet is color coded for ease of viewing assigned scores by age bracket and category. A legend for color codes and associated weight is provided at the bottom, generally denoted by reference numeral 154.

Figure 3D:
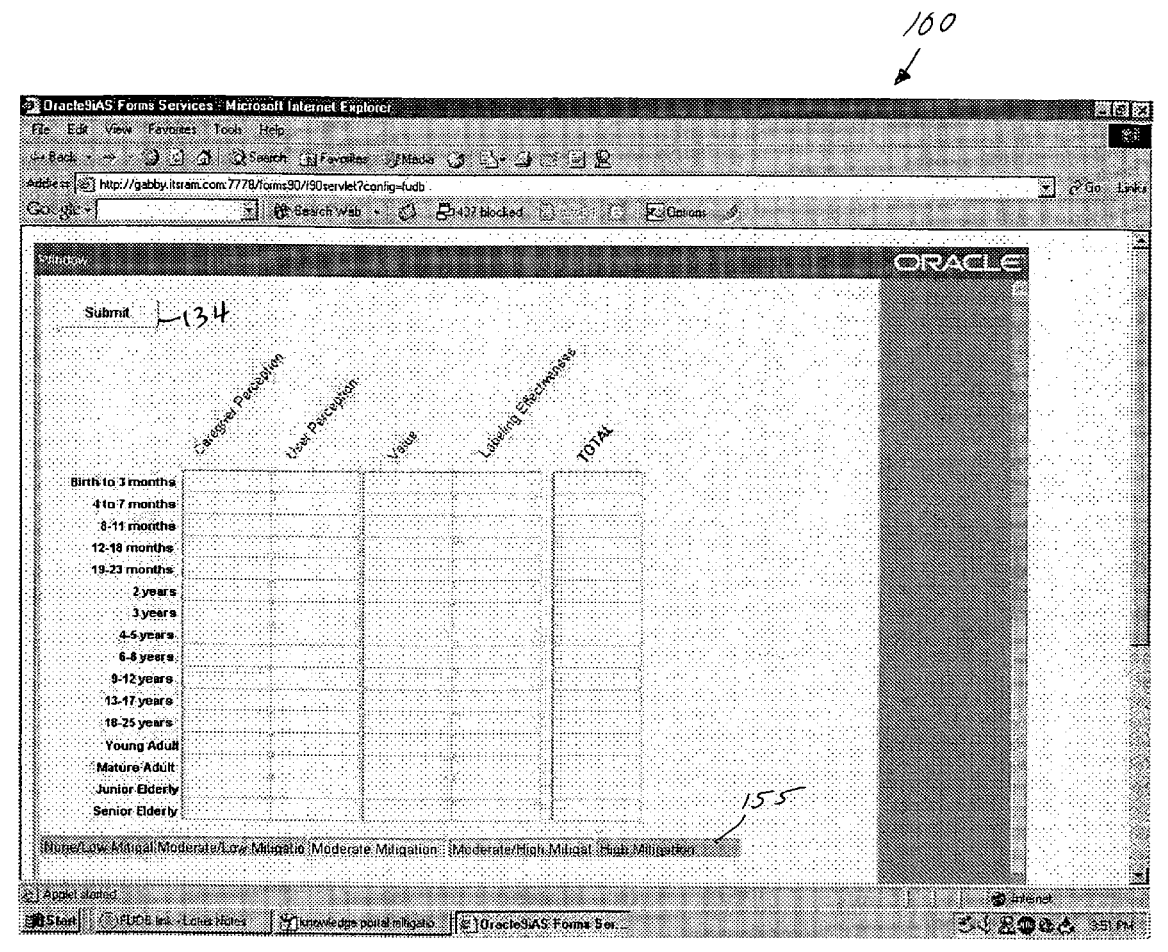

FIG. 3D represents a GUI showing a blank mitigation summary grid prior to a user clicking the submit button 134 of FIG. 3A. The mitigation summary may be arranged in many different manners, but for illustrative purposes is shown arranged by age brackets along one axis and mitigation categories (e.g., caregiver perception, user perception, value, labeling effectiveness) along the other. Once the submit button 134 is clicked, a summation of the mitigation scoring is composed and displayed in a color coded manner similar to the manner of presenting scores of FIG. 2D and in conformity with the color coding legend 155. The TOTAL column is a color coded composite score of the other columns providing an overall mitigation score by age brackets.

Figure 4:
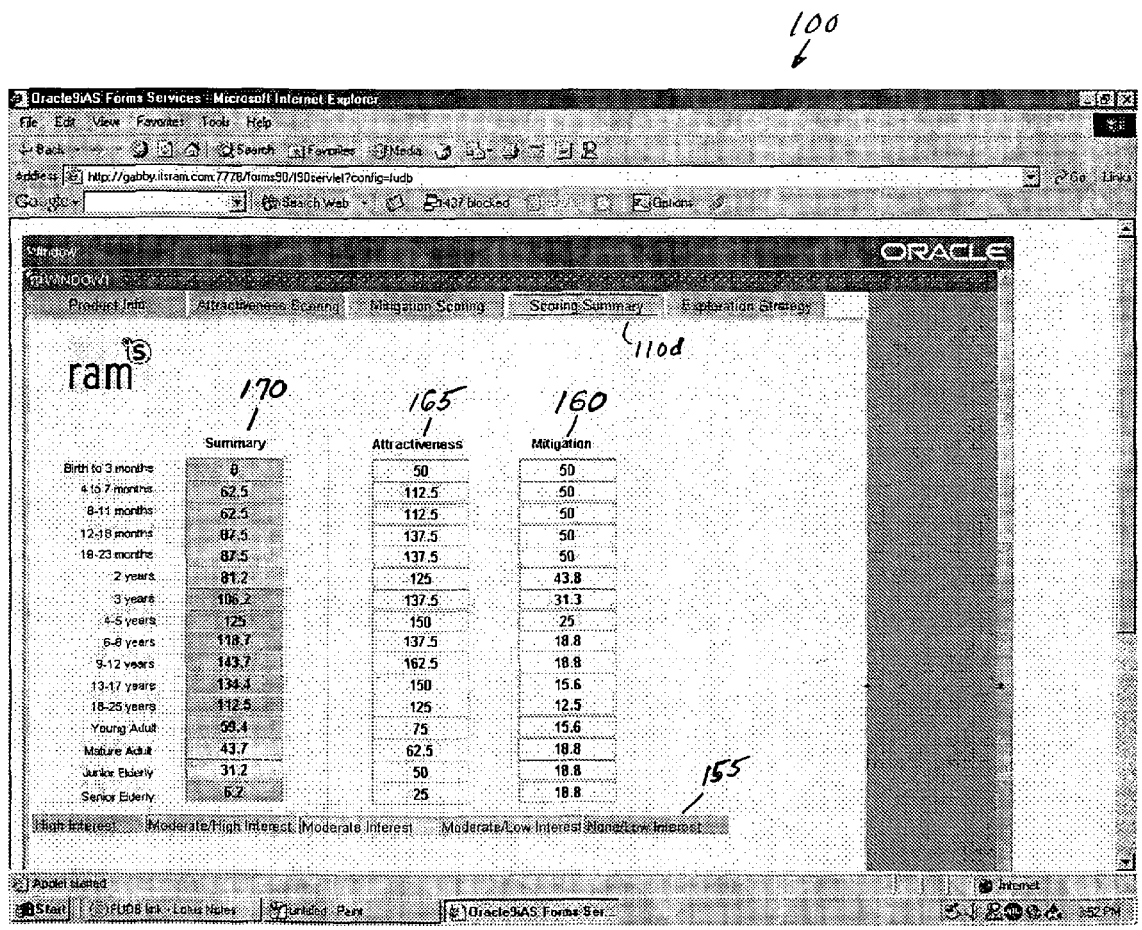
FIG. 4 represents a GUI showing an overall scoring summary presentation.

FIG. 4 represents a GUI showing a scoring summary presentation which may be reached by the scoring summary navigation tab 110d. This presentation imports the composite TOTAL mitigation scores (TOTAL column) of FIG. 3B (i.e., after the submit button 134 has been clicked and scores are generated) into column 160 and imports the composite TOTAL attractiveness scores (TOTAL column) of FIG. 2D into column 165. The difference (by age bracket) between the composite attractiveness scores in column 165 and the composite mitigation scores in column 160 provide the overall composite summary in the summary column 170 by age bracket. For example, referring to the 4-7 months age bracket, the attractiveness composite score is 112.5 and the mitigation composite score is 50 for a particular product. The difference produces an overall composite summary score of 62.5 reflecting the effect of mitigation factors associated with the product offsetting the attractiveness factors associated with the product for the 4-7 months age bracket. All other age brackets are computed in like manner and are summarized in column 170 with color coding similar to FIG. 2D and in accordance with the color coding legend 155. in essence, this composite score may then be used to objectively determine a risk of a particular product.

Summary column 170, therefore, provides a uniform scoring taking into account product features that contribute to risk and factors that also extenuate risk. The resulting score, in this example, for age bracket 9-12 years receives the highest scoring of 143.7 (color coded red for high interest). Age brackets 3 years through 18-25 years are also color coded red representing a high interest level and provides an indication of risk level associated with the product.

FIG. 5A-5D is an embodiment of an exploration strategy GUI showing a series of exploration questions 180 comprising questions 1-41. Of course, these questions are illustrative examples and are not to limit the invention. FIG. 5E is a representation of a GUI showing an embodiment of an overall exploration composite score matrix 185. The questions may be accessed via exploration strategy navigation tab 110e and by moving the slide tab 150 as needed to view all questions. Exploration strategy provides for more detailed probing into the nature of a product's features for associating risk and interest levels by age groups according to a predetermined weighting. The Exploration Strategies that children use to learn are based on the developmental stages. These Exploration Strategies vary in frequency and intensity depending on a child's stage of development, the degree of stimulation, and the child's environment. However, all children use the same sequence of Exploration Strategies and should be expected to use all of the Exploration Strategies available to them. As a user responds to each question 180 in the affirmative, a predetermined composite scoring matrix is imported for each question to achieve an overall exploration composite score matrix, generally denoted by reference numeral 185. The overall exploration composite score matrix 185 includes the following exploration product attributes (as shown in FIG. 5E):

- Mouthing Objects—As a result of child development research, it is clear that mouthing is the foundation upon which all knowledge of objects is built. Infants primarily explore through their mouths. Mouthing gives infants more information about an object than all of the other exploration strategies combined. A young infant is driven to place both familiar and novel objects in his/her mouth. Through actively mouthing, a child learns about the texture, size, consistency, and shape of objects. For children with developmental delays, this strategy may be used well into the school-age years depending on what other exploration strategies the child has available to him/herself. The mouth is also a source of pleasure for children (and adults), which often lead to mouthing for extended periods of time. Children as old as 14-years of age will mouth an object that gives pleasurable feedback (i.e., balloons, rubber or pliable plastic objects, or anything that feels good to chew or suck on). Another cause of mouthing resides in the object itself. If a child perceives that the object looks like food, smells like food, or in any way reminds him/her of food, the child is more likely to mouth that object. Finally, children are teething into the teenage years. When children are getting new teeth, one source of relief can be chewing on an object. For all of these reasons, mouthing of objects often continues to occur—at least to some degree—throughout an individual's entire lifetime.
- Alternating Mouthing and Looking—Young children soon begin to integrate their visual capacity into exploration of objects by looking at an object and then mouthing it and vice versa. They are learning to connect the visual image of an object with the way it feels in the mouth.
- Rotating Objects and transferring Hand-to-Hand—Once children have a visual image of the object, which has recently mouthed, they discover during their mouthing/looking play, that an object has more than one side. This leads to children rotating the object as they visually inspect it. Initially, children rotate the object with one hand, turning it back and forth; visually examining the different sides. With increased motor co-ordination, they become able to use both hands to rotate the object. This strategy allows children to turn the object around completely by passing it from one hand to the other. Both of these strategies allow children to learn about object properties (size, shape, weight, and consistency), but they also provide an opportunity to develop new motor skills such as releasing, grasping, and coordination of both hands.
- Insertion (Body into Object)—This type of exploration begins when children become capable of isolating one finger. That is, when they are able to extend one finger without all of their other fingers extending. Children then begin to explore objects by putting their finger inside the objects or running their finger along the outside of the object. Although the isolation of one finger initiates this strategy, it is not limited to this alone. Children will insert other body parts (hands, feet, legs, head, etc.) and their entire bodies into objects as they explore. Children will also explore the objects within their environments, as well as their own bodies, by placing objects into their own body cavity. This type of insertion strategy is used most extensively (but not limited to) two and three-year-old children.
- Banging, Throwing, Dropping Objects—Children may bang objects to hear what sounds different objects can make. It may also give feedback to children about the weight of the object. Dropping of objects begins extremely early in the life of a child. This type of exploration allows children to begin learning that objects continue to exist even when out of their sight and that they can have a certain level of control over the actions of their parents or caregivers. Throwing objects is a favorite activity of children under the age of 5 years. Children begin throwing whatever they can grasp. This strategy may provide information to children about weight as well as being an exercise of motor skills and a statement of power.
- Combining Objects—When children combine objects they are beginning to explore by placing things together. Infants and toddlers in particular enjoy these new attempts to see the many different ways that objects can possibly fit together. For example, they begin to experiment with questions such as, "Can this one object fit on top of, inside or over this other object?"
- Matching Objects—In their toddler years, children begin to notice and play with the concept "same" and "different". They can be observed trying to find objects with similar characteristics or functions and puts them together.
- Using Appropriately—Children do occasionally play or interact with objects in the manner in which they were intended. For example, a telephone is used to talk into, a bottle is fed to a doll, or a food product is simply eaten by the child. At this point, children have begun to explore the functions of objects. Early in this stage of development children may not understand, and sometimes even become upset, if another person uses the object in a way that does not make sense.
- Representational Play—This exploration strategy involves children using their imaginations and various objects to re-create their "real life" observations. Children put together dramas using objects as props. These play dramas can be about anything that a child considers to be "real life" including, but not limited to, play about family roles, play about different occupations, and play about cartoons or superheroes. This type of play or exploration helps children to learn about the social roles in the world around them.
- Using Imaginatively—Once children become no longer content to use objects as they were intended, they begin to branch out and discover all of the various possibilities for the object. This may lead to experimentation with all the previous strategies on a given object children attempt to push the limits of the object and obtain optimal stimulation.
- Testing the Limits—School-age children are often interested in testing the limits of objects by increasing the risk involved in using them. For example, a ten-year-old child might be interested in what happens when you drop an object from a high place; or what happens when you light an object on fire; or what happens when you run an object over with a car. The answers to these questions assist children in an understanding of objects and transformations the objects can undergo. Unfortunately, children's' sense of cause and effect and the possible "risk" to themselves is not well developed. In fact, children at this stage often perceive themselves to be invincible.

The overall exploration score 185 may be the result of combining one or more predetermined composite scoring matrices. That is, after all the questions 180 are answered (Yes or No) and the submit button 131 is clicked, the overall exploration score 185 may be generated.

Figure 5A:
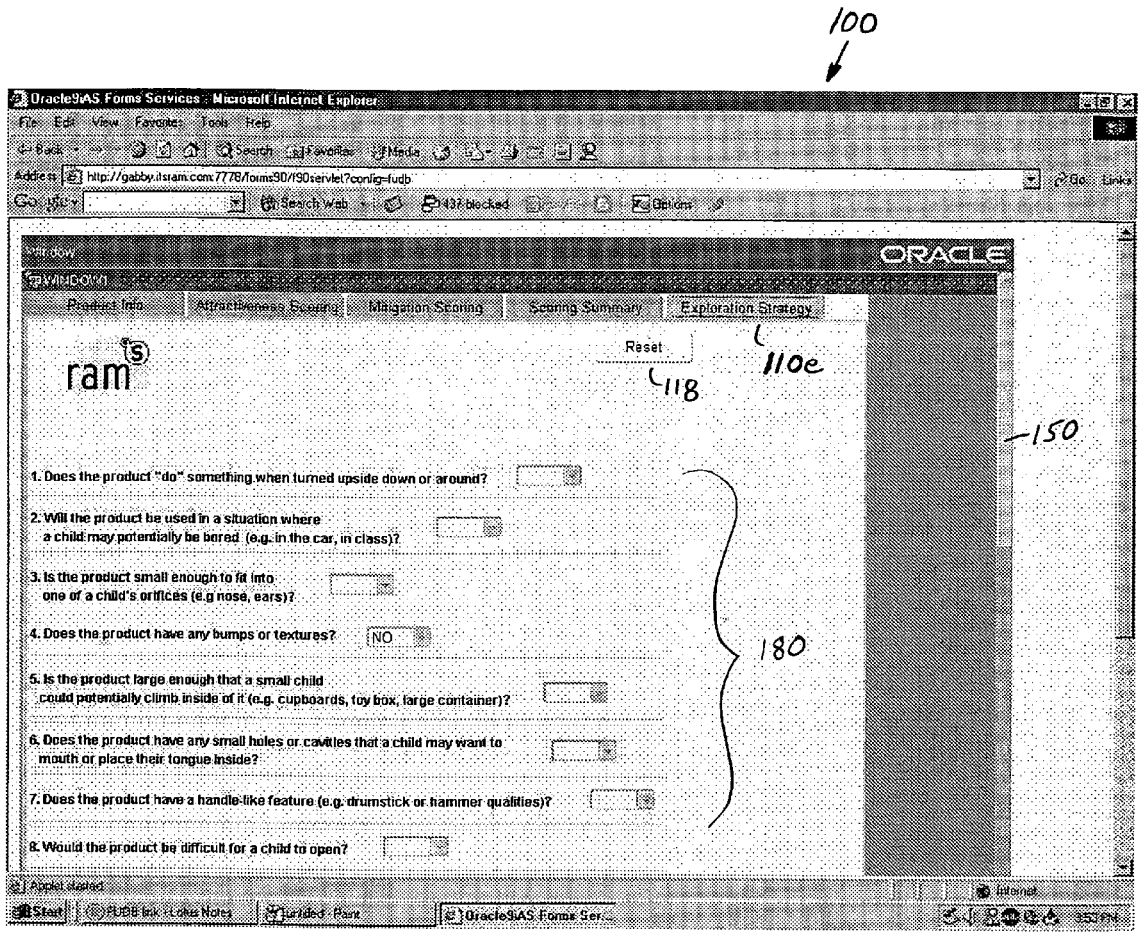
Figure 5B:
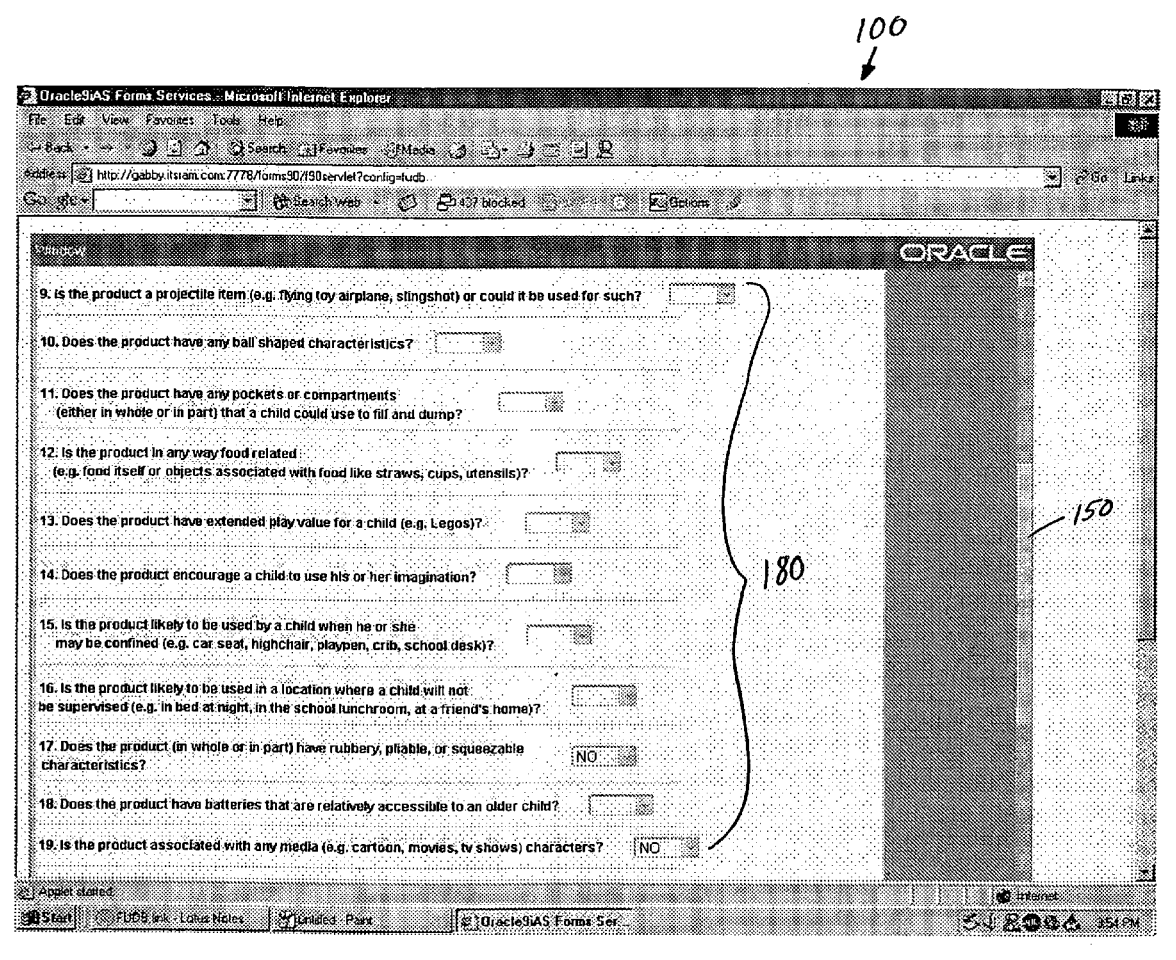
Figure 5D:
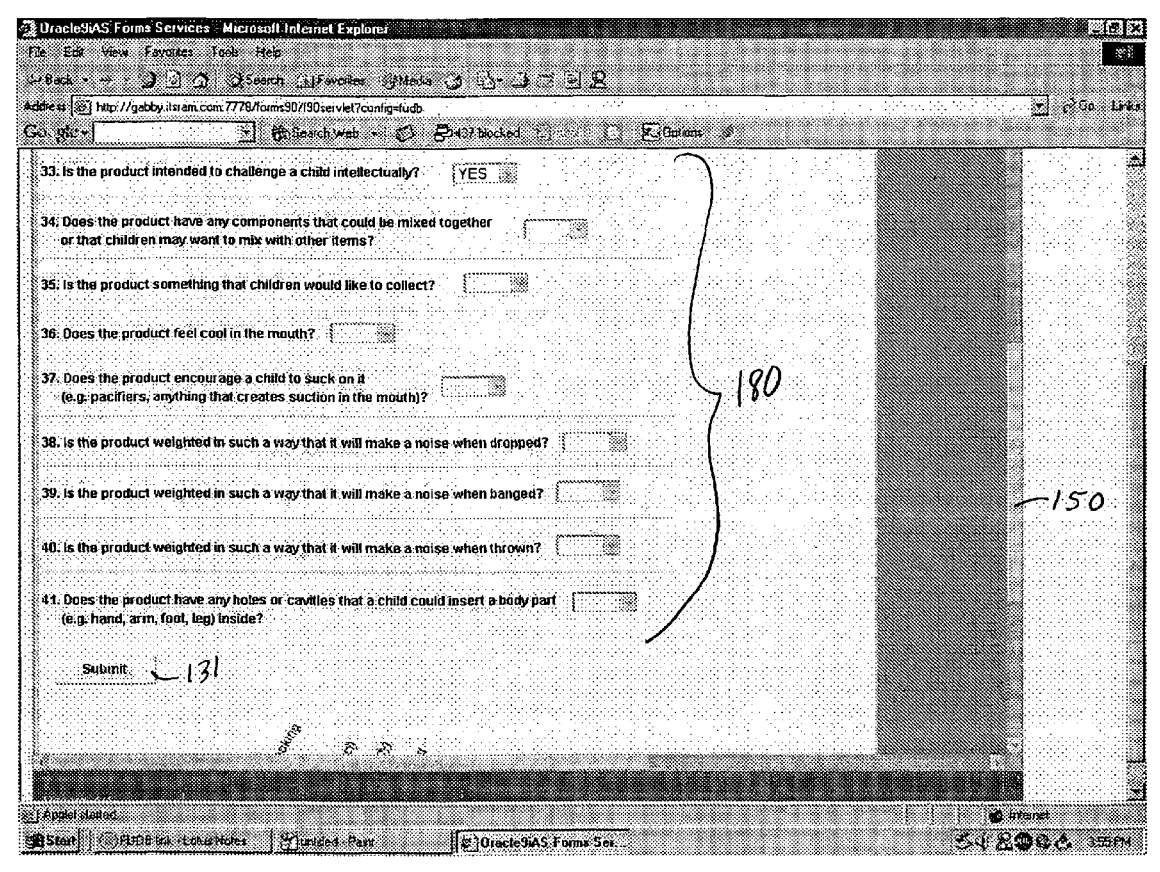
Figure 5E:
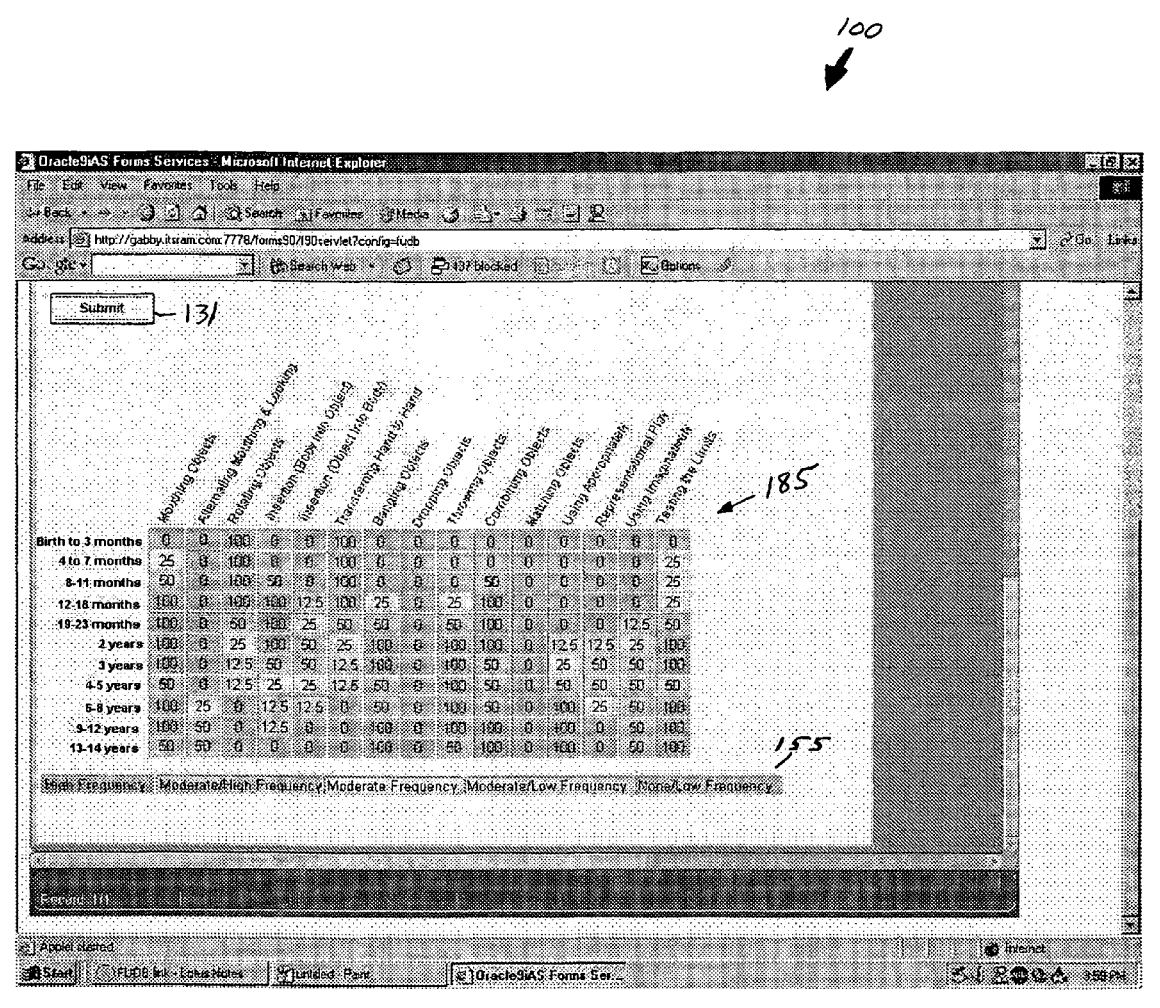

By way of example, if a user responds in the affirmative to questions 1 through 5 of FIG. 5A (although the user may respond to any number of questions in the affirmative), and negative to all the remaining questions, a resulting overall exploration composite score (e.g., 185 of FIG. 5E) reflects the combined scores of five underlying predetermined composite scoring matrices.

Figure 6A:
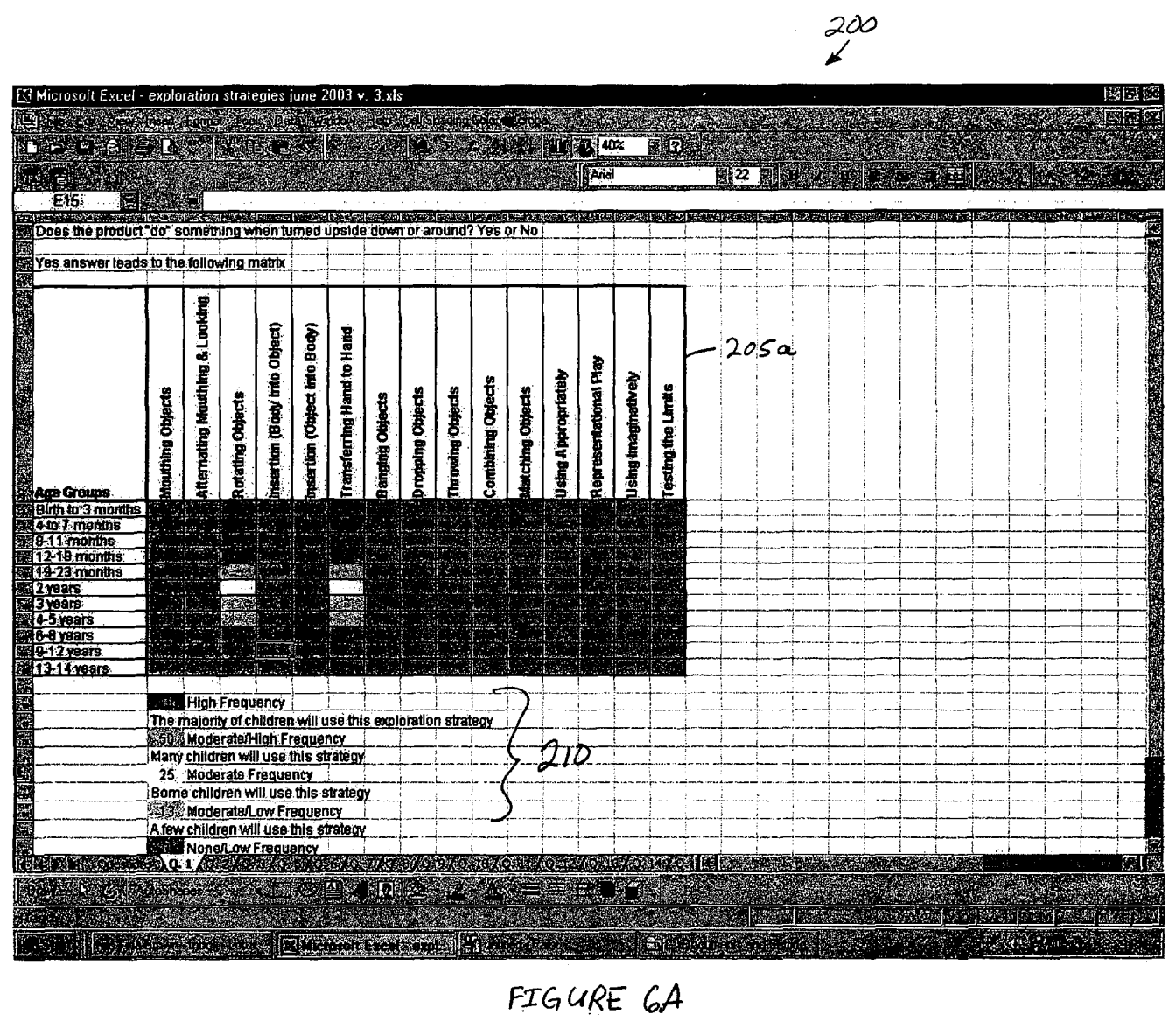
Figure 6B:
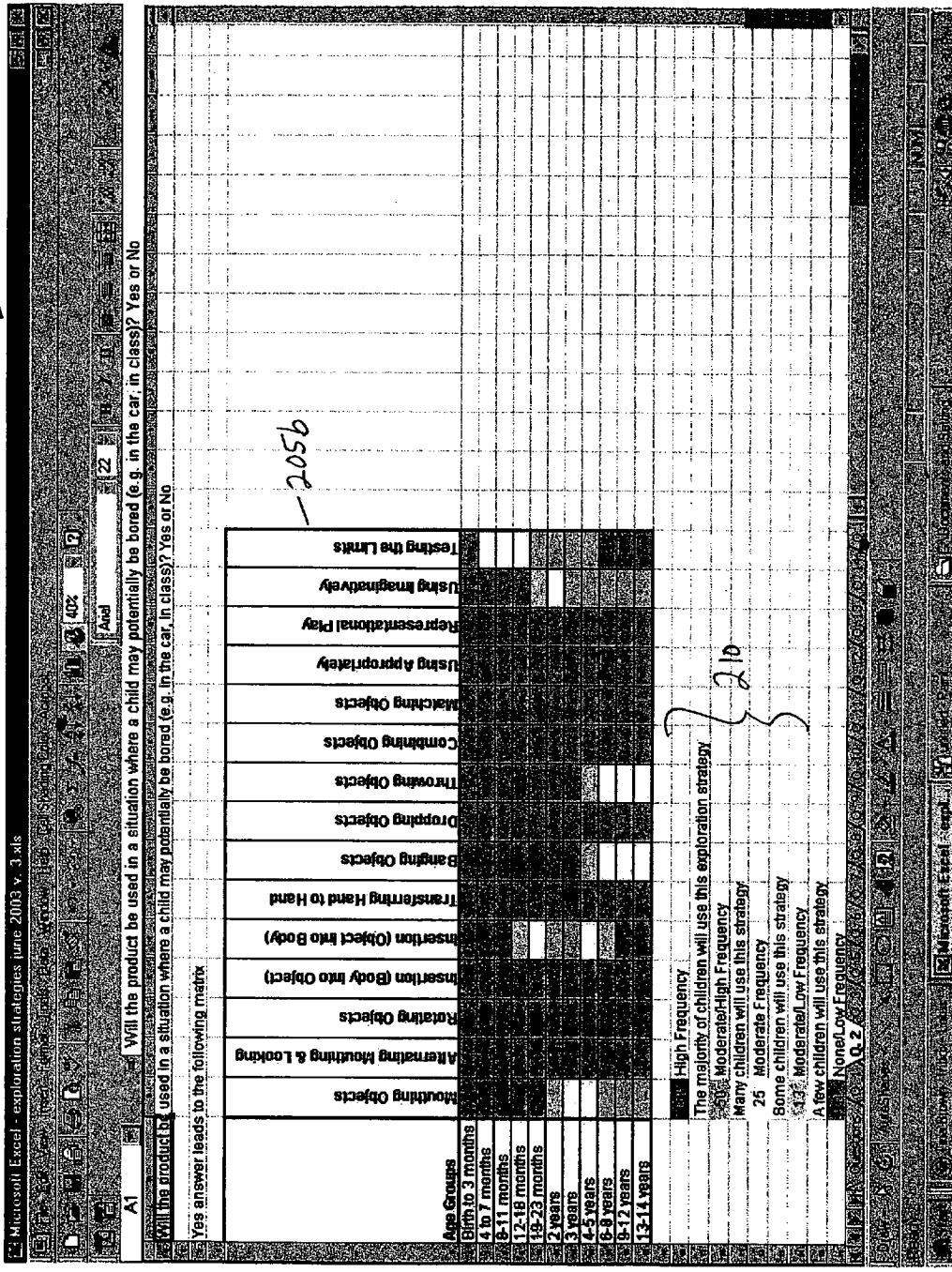

FIG. 6A-6E are Excel™ (Excel™ is a trademark of Microsoft Corporation) spreadsheet representations, generally denoted by reference numeral 200, of the underlying predetermined composite scoring matrices, generally denoted by reference numeral 205a-205e, for the questions 1-5, respectively. The use of an Excel™ layout is for illustrative purposes and is typically not viewable by a user. Referring to FIG. 6A, predetermined composite scoring matrix 205a represents the predetermined composite score matrix for question 1 (FIG. 5A) and has high frequency scores (i.e., red, 100) in two attributes, rotating objects and transferring hand to hand, for age brackets birth to 3 months through 12-18 months. In the same two attributes, a score of moderate/high frequency (i.e., orange, 50) in the 19-23 month age bracket, a score of moderate frequency (i.e., yellow, 50) in the 2 year age bracket, and a score of moderate/low frequency (i.e., green, 13) in the 3 years to 4-5 years age bracket is shown. All other attributes and age brackets are none/low frequency (i.e., blue, 0).

Figure 6C:
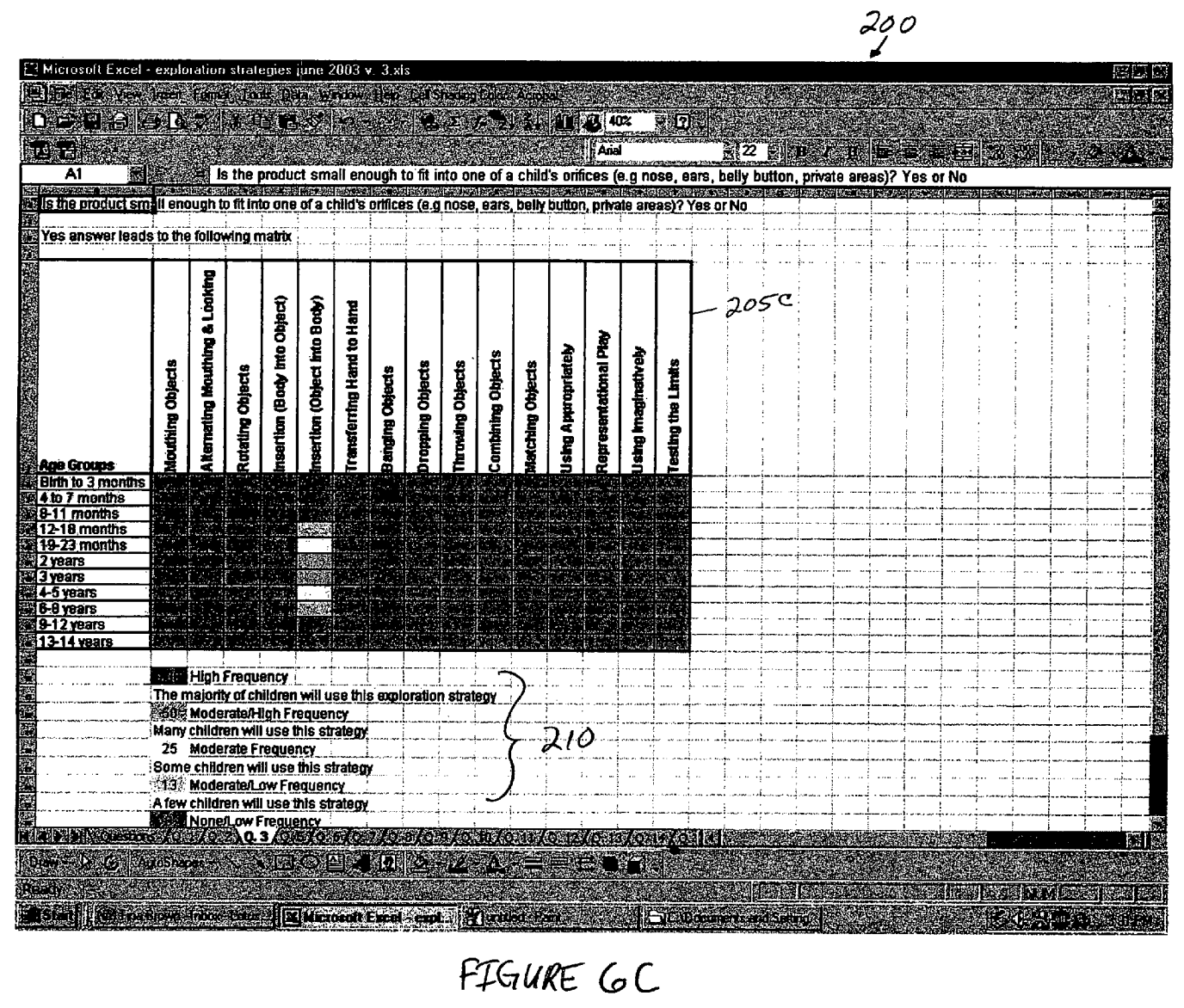

Predetermined composite scoring matrix 205b of FIG. 6B represents the predetermined composite score matrix for question 2 (FIG. 5A) with predetermined non-blue scores (i.e., none/low) in six attributes (or characteristics) (i.e., mouthing objects, insertion (object into body), banging objects, throwing objects, using imaginatively, and testing the limits). Predetermined composite scoring matrix 205c of FIG. 6C represents the predetermined composite score matrix for question 3 (FIG. 5A) and has predetermined scores in the insertion (object into body) attribute column only.

Figure 6D:
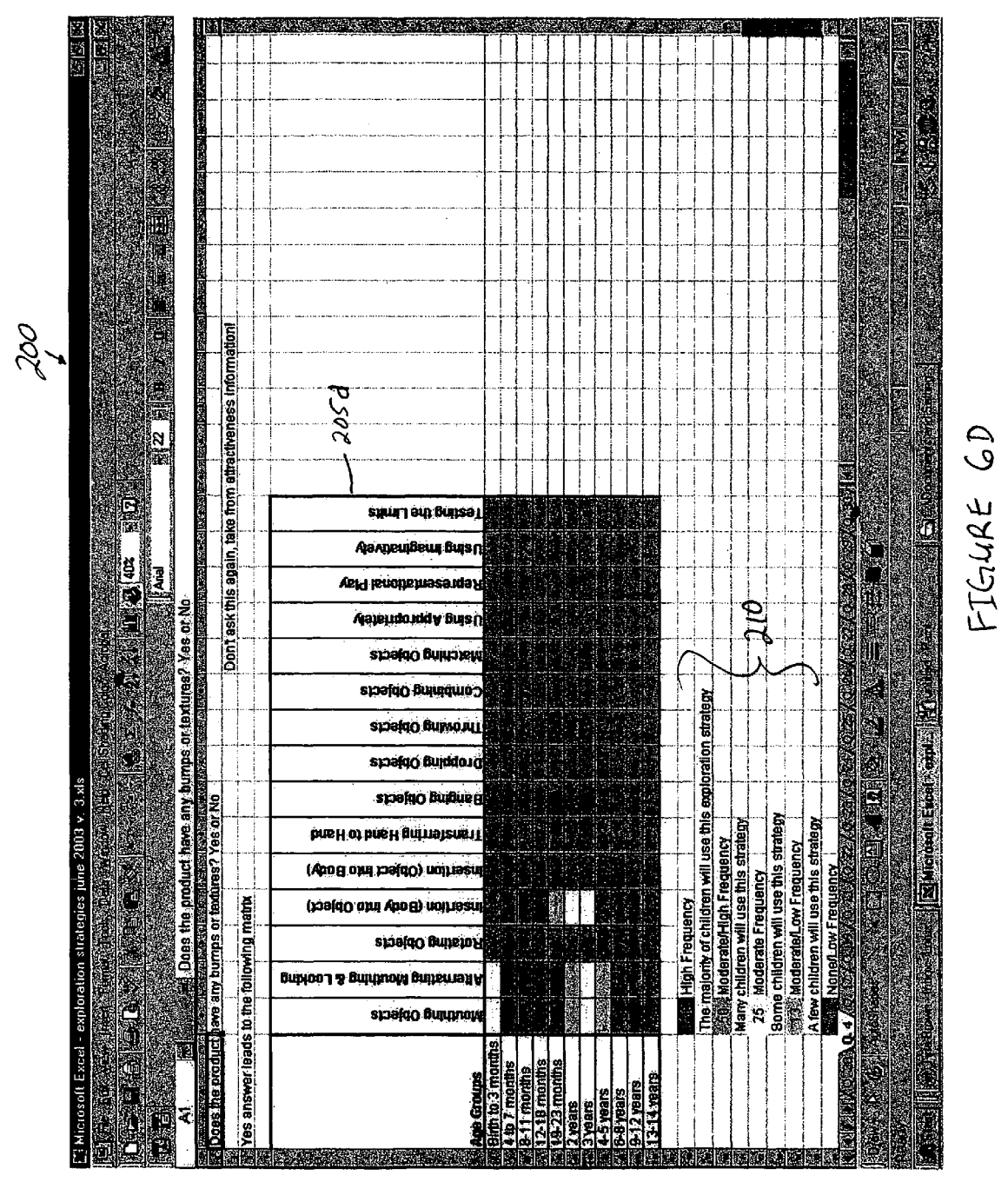
Figure 6E:
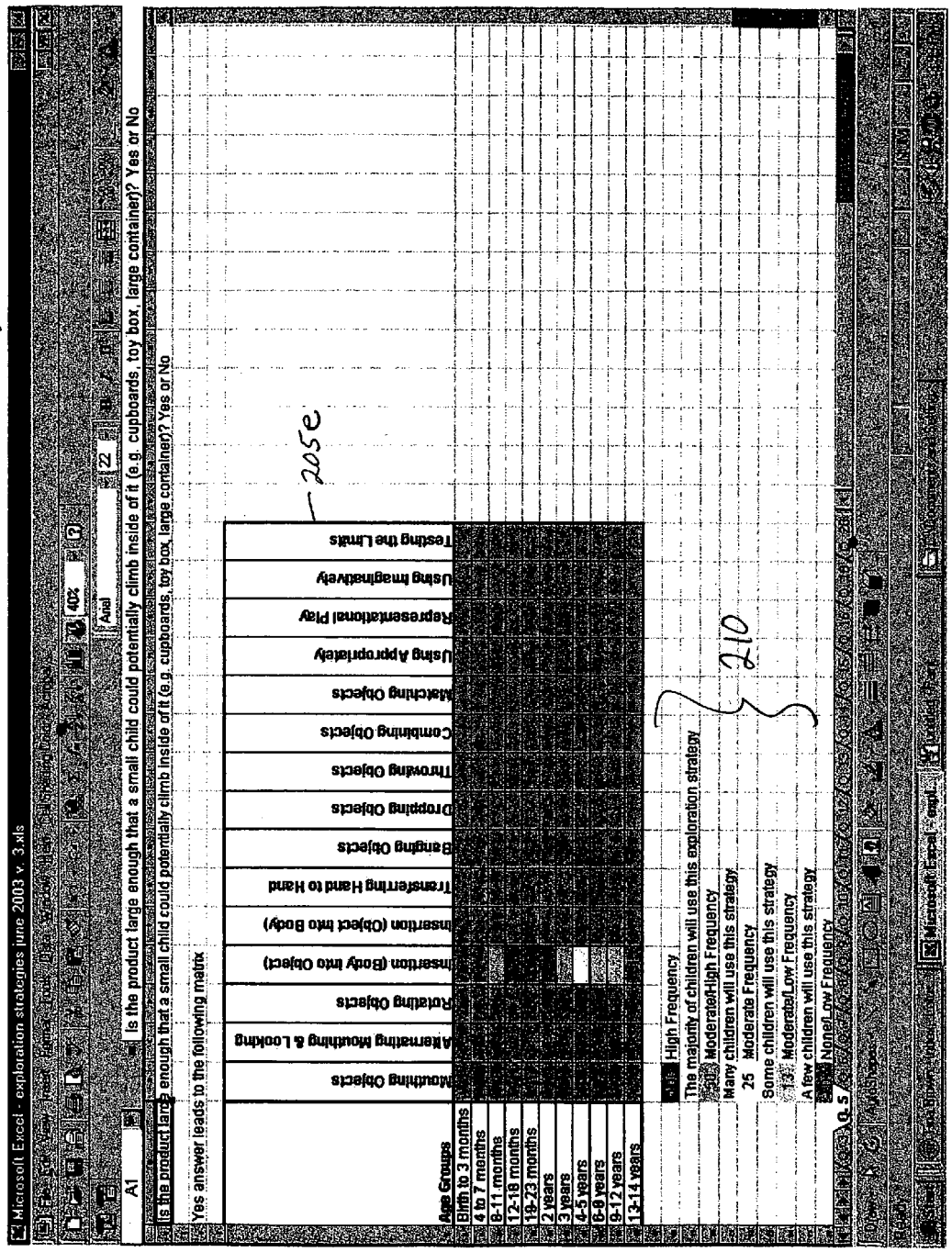

Predetermined composite scoring matrix 205d of FIG. 6D represents the predetermined composite score matrix for question 4 (FIG. 5A) and has three attributes with one or more non-blue scores, and, likewise, predetermined composite scoring matrix 205e of FIG. 6E represents the predetermined composite score matrix for question 5 (FIG. 5A) has one attribute (insertion (body into object)) with non-blue scores.

Each of the predetermined scoring matrices 205a-205e are shown scored and color coded by product exploration attribute and age bracket. The color codes correspond similarly with the color codes of FIG. 2D and with the color coding legend 210. In a like manner, the invention provides a predetermined composite scoring matrix, similar to 205a-205e, for every question 180 (e.g., questions 1-41, FIG. 5A-5D), each with its own scoring by age bracket and attribute based on historical researched data of behavior patterns and interest levels relevant to the attributes by age bracket.

Continuing the example, when the submit button is clicked 131, the overall exploration composite score 185 combines the predetermined composite scoring matrices 205a-205e (those corresponding to affirmative responses) producing an overall exploration composite score (e.g., 185). Typically, the highest score for a cell is used as the composite score; however, other methods may be used to generate the composite score, as one of ordinary skill in the art would recognize. It should also be apparent to one of ordinary skill in the art that if other questions are responded in the affirmative, then corresponding composite scoring matrices are included in the overall exploration composite score 185.

Using the Invention

Figure 7:
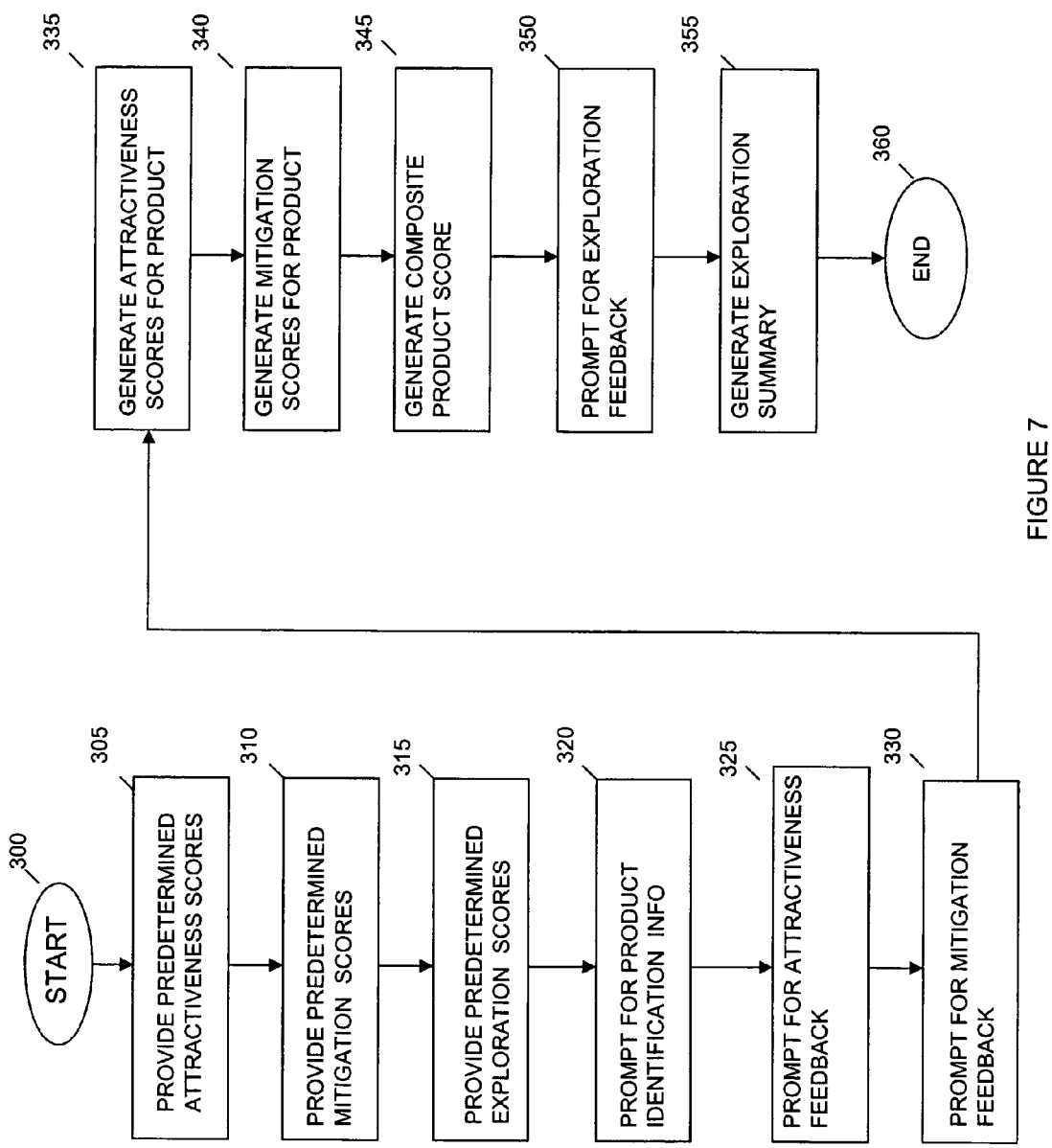
FIG. 7 is a flow chart of an embodiment showing steps of using the invention.

FIG. 7 is a flow chart of an embodiment showing steps of using the invention, starting at step 300. FIG. 7 may equally represent a high-level block diagram of components of the invention implementing the steps thereof. The steps of FIG. 7 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). At step 305, predetermined scores may be provided (e.g., as shown by 130 and 140 in FIGS. 2C and 2D) for various product attributes reflective of possible characteristics that a product may have. At step 310, predetermined mitigation scores may be provided for scoring various mitigation categories for a product. At step 315, predetermined exploration scores may be provided for scoring exploration feedback for a product. At step 320, prompting for product identification occurs for establishing the identity of a product under review or assessment. At step 325, prompting for attractiveness feedback occurs. At step 330, prompting occurs to receive feedback concerning mitigation categories. At step 335, attractiveness scoring occurs for the product (e.g., FIG. 2F, 135b). At step 340, mitigation scoring occurs for the product (e.g., FIG. 3B). At step 345, a composite product score may be generated using composite attractiveness scores and composite mitigations scores (e.g., FIG. 4). The composite product score may be indicative of product attractiveness and/or risk. At step 350, prompting for exploration feedback occurs, and at step 355, an exploration summary is generated. The process ends at step 360.

The invention provides a consistent process for characterizing products for attractiveness by age brackets and attributes of a product. From the resulting scores, levels of risk may be predicted and these levels of risk may be used, for example, to redirect choices concerning design criteria, product materials, product effects, product perception, etc. The scoring may also be used by potential buyers of products as a guide to risk and/or attractiveness factors by age groups. The scores may also be used to guide product marketing efforts.

While the invention has been described in terms of embodiments, those skilled in the art will recognize that the invention can be practiced with modifications and in the spirit and scope of the appended claims.

What is claimed is:

1. A computer-implemented method for assessing product risk comprising the steps of:
    providing predetermined attractiveness scores associated with product attributes and one or more age brackets for a product, the product attributes including images, color, textures, movement, light, noise, smell, and taste, wherein the providing occurs prior to a market introduction of the product;
    prompting for feedback relating to each of the product attributes;

providing predetermined mitigation scores associated with one or more mitigation categories and the one or more age brackets;

prompting for mitigation feedback;

generating a composite attractiveness score and a composite mitigation score based on the feedback;

generating a composite product score based on a difference between the composite attractiveness score and the composite mitigation score for an age bracket;

computing at least one product score for the product attributes based on the predetermined attribute scores and the feedback; and outputting the composite product score to be used at least in part to change a design criteria of the product, wherein the providing, prompting, computing and outputting steps are performed by a computer.

2. The method of claim 1, further comprising the step of:

generating at least one mitigation score based on the mitigation feedback, wherein the mitigation score provides a mitigation to the at least one product score.

3. The method of claim 2, wherein the mitigation feedback relates to at least one of a caregiver perception, a user perception, a value, and a labeling effectiveness.

4. The method of claim 1, wherein the composite product score is indicative of risk level for a certain age group using a certain product.

5. The method of claim 2, wherein the mitigation score is color coded.

6. The method of claim 1, wherein the product attributes include at least one of a sensory attribute, a physical attribute, and a cognitive attribute.

7. The method of claim 6, wherein the sensory attribute includes at least one of a image attribute, a color attribute, a texture attribute, a movement attribute, a light attribute, a sound attribute, a smell attribute, and a taste attribute, and wherein the cognitive attribute includes at least one of a challenge attribute and an influential attribute.

8. The method of claim 7, wherein the image attribute includes at least one of a no face, a simple outline of a face, a representation of a human face, a representation of a recognizable character, a representation of a generic character, a recognizable object, and an abstract recognizable image.

9. The method of claim 7, wherein, the color attribute includes at least one of a non-primary/neutral color, a primary/bright color, a black and white color, multiple contrasting colors, and a shiny/reflective color.

10. The method of claim 7, wherein the challenge attribute includes at least one of opportunity for intellectual challenge and no opportunity for intellectual challenge.

11. The method of claim 6, wherein the physical attribute includes at least one of no physical opportunity, encouraging gross motor skills, encouraging individual fine motor skills, and interactive physical activity attribute.

12. The method of claim 1, further comprising the steps of:

providing one or more predetermined exploration scores having one or more exploration attributes and one or more age brackets;

prompting for feedback relating to one or more exploration questions, each of the one or more exploration questions having an associated one of the one or more predetermined exploration scores; and generating an exploration summary score based on affirmatively answered questions of the feedback and corresponding associated one or more predetermined exploration scores associated with the affirmatively answered questions, the exploration summary having the one or more exploration attributes and the one or more age brackets, wherein the exploration summary is indicative of behavior preferences by the one or more age brackets and the one or more exploration attributes.

13. The method of claim 12, wherein the one or more exploration attributes include at least one of a mouthing object, an alternating mouthing and looking object, a rotating object, a first insertion attribute, a second insertion attribute, a transferring hand to hand attribute, a banging objects attribute, a dropping objects attribute, a throwing objects attribute, a combining objects, a using appropriately attribute, a representational play attribute, a using imaginatively object attribute, and a testing the limits attribute.

14. A computer-implemented method for assessing product risk comprising the steps of:

providing predetermined attractiveness scores associated with product attributes and one or more age brackets for a product, the product attributes including images, color, textures, movement, light, noise, smell and taste, wherein the providing predetermined attractiveness scores occurs prior to a market introduction of the product;

providing predetermined mitigation scores associated with one or more mitigation categories and the one or more age brackets;

providing mitigation feedback;

generating a composite attractiveness score~ and a composite mitigation score based on the mitigation feedback;

generating a composite product score based on a difference between the composite attractiveness score and the composite mitigation score for an age group; and outputting the composite product score for changing a design criteria of the product, wherein each of the providing and generating steps execute on a computer platform.

15. The method of claim 14, wherein the composite product score is indicative of at least one of behavioral attractiveness and risk.

16. The method of claim 14, further comprising the steps of:

providing one or more predetermined exploration scores having one or more exploration attributes and one or more age brackets;

prompting for feedback relating to one or more exploration questions, each of the one or more exploration questions having an associated one of the one or more predetermined exploration scores; and generating an exploration summary score based on affirmatively answered exploration questions using the one or more predetermined exploration scores associated with the affirmatively answered questions, wherein the exploration summary is indicative of behavior preferences by the one or more age brackets and the one or more exploration attributes.

17. The method of claim 14, wherein the one or more product attributes include at least one of a sensory attribute, a physical attribute, and a cognitive attribute and the one or more mitigation categories includes at least one of a caregiver perception, a user perception, a value, and a labeling effectiveness.

18. A computer program product embodied in a storage medium having components for executing a process, the computer program product when executed on a computer for assessing product attractiveness and risk, comprising:

a first component embodied in a storage medium to provide predetermined attractiveness scores associated with product attributes and one or more age brackets for a product, the product attributes including images, color, textures, movement, light, noise, smell and taste, wherein the first component provides predetermined attractiveness scores prior to a market introduction of the product;

a second component embodied in a storage medium to prompt for feedback relating to each the product attributes; and a third component embodied in a storage medium to compute a product attractiveness score for the product attributes based on the predetermined attribute scores and the feedback;

a fourth component embodied in the storage medium to provide predetermined mitigation scores associated with one or more mitigation categories and the one or more age brackets;

a fifth component embodied in a storage medium to prompt for mitigation feedback; and a sixth component embodied in a storage medium to generate a composite attractiveness score, and a composite mitigation score based on the mitigation feedback; and a seventh component embodied in a storage medium to generate and output a composite product score based on a difference between the composite attractiveness score and the composite mitigation score for changing a design criteria of the product.

19. The computer program product of claim 18, wherein the composite product score is indicative of risk level.

20. The computer program product of claim 18, wherein the mitigation score and attractiveness score are color coded.

21. The method of claim 1, wherein the providing step occurs during design of the product.

22. The method of claim 14, wherein the providing predetermined attractiveness scores step occurs during design of the product.

23. The computer program product of claim 18, wherein the providing predetermined attractiveness scores step occurs during design of the product.

* * * * *